United States Patent
Gadelrab et al.

(10) Patent No.: US 10,484,685 B2
(45) Date of Patent: Nov. 19, 2019

(54) SYSTEM AND METHOD FOR INTELLIGENT DATA/FRAME COMPRESSION IN A SYSTEM ON A CHIP

(71) Applicant: QUALCOMM INCORPORATED, San Diego, CA (US)

(72) Inventors: Serag Gadelrab, Markham (CA); Chinchuan Chiu, Poway, CA (US); Moinul Khan, San Diego, CA (US); Kyle Ernewein, Toronto (CA); Tom Longo, Markham (CA); Simon Booth, San Diego, CA (US); Meghal Varia, North York (CA); Milivoje Aleksic, San Diego, CA (US); King-Chung Lai, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 15/490,625

(22) Filed: Apr. 18, 2017

(65) Prior Publication Data
US 2018/0302625 A1    Oct. 18, 2018

(51) Int. Cl.
*H04N 19/127* (2014.01)
*G06F 3/06* (2006.01)
(Continued)

(52) U.S. Cl.
CPC ........... *H04N 19/127* (2014.11); *G01K 13/00* (2013.01); *G06F 3/0604* (2013.01); *G06F 3/064* (2013.01); *G06F 3/067* (2013.01); *G06F 3/0653* (2013.01); *G06T 3/40* (2013.01); *H04N 19/176* (2014.11); *H04N 19/426* (2014.11); *H04N 19/65* (2014.11)

(58) Field of Classification Search
None
See application file for complete search history.

(56) References Cited

U.S. PATENT DOCUMENTS

| 6,879,266 B1 | 4/2005 | Dye et al. |
| 8,031,937 B2 | 10/2011 | Rasmusson et al. |
| (Continued) | | |

FOREIGN PATENT DOCUMENTS

| GB | 2339989 A | 2/2000 |
| WO | 2015004877 A1 | 1/2015 |

OTHER PUBLICATIONS

International Search Report and Written Opinion—PCT/US2018/025240—ISA/EPO—dated Jul. 9, 2018.

*Primary Examiner* — Tyler W. Sullivan
(74) *Attorney, Agent, or Firm* — Smith Tempel Blaha LLC/Qualcomm

(57) ABSTRACT

An exemplary method for intelligent compression defines a threshold value for a key performance indicator. Based on the key performance indicator value, data blocks generated by a producer component may be scaled down to reduce power and/or bandwidth consumption when being compressed according to a lossless compression module. The compressed data blocks are then stored in a memory component along with metadata that signals the scaling factor used prior to compression. Consumer components later retrieving the compressed data blocks from the memory component may decompress the data blocks and upscale, if required, based on the scaling factor signaled by the metadata.

28 Claims, 18 Drawing Sheets

(51) Int. Cl.
  *H04N 19/426* (2014.01)
  *H04N 19/176* (2014.01)
  *H04N 19/65* (2014.01)
  *G06T 3/40* (2006.01)
  *G01K 13/00* (2006.01)

(56) References Cited

U.S. PATENT DOCUMENTS

| | | | |
|---|---|---|---|
| 8,194,736 B2 | 6/2012 | Youn | |
| 9,177,393 B2 | 11/2015 | Teng et al. | |
| 9,185,424 B2 | 11/2015 | Teng | |
| 10,170,127 B2 | 1/2019 | Jung et al. | |
| 2002/0094028 A1* | 7/2002 | Kimoto | H04N 19/176 375/240.14 |
| 2005/0249420 A1 | 11/2005 | Takahashi et al. | |
| 2006/0215755 A1* | 9/2006 | Ju | H04N 19/172 375/240.12 |
| 2007/0120980 A1* | 5/2007 | Jung | G08B 13/19667 348/207.1 |
| 2007/0171988 A1 | 7/2007 | Panda et al. | |
| 2008/0212884 A1 | 9/2008 | Oneda et al. | |
| 2009/0238277 A1* | 9/2009 | Meehan | H04N 19/124 375/240.16 |
| 2010/0046628 A1 | 2/2010 | Bhaskaran et al. | |
| 2010/0104021 A1* | 4/2010 | Schmit | H04N 19/139 375/240.24 |
| 2012/0275718 A1* | 11/2012 | Takamori | G06K 9/36 382/238 |
| 2013/0050254 A1* | 2/2013 | Tran | G06F 3/14 345/629 |
| 2013/0083837 A1* | 4/2013 | Heng | H04N 19/30 375/240.01 |
| 2013/0251256 A1 | 9/2013 | Deng et al. | |
| 2014/0169480 A1* | 6/2014 | Lachine | G06T 9/00 375/240.23 |
| 2014/0192075 A1 | 7/2014 | Stamoulis et al. | |
| 2014/0293307 A1* | 10/2014 | Yamada | G06F 3/1215 358/1.13 |
| 2014/0376615 A1* | 12/2014 | Sano | H04N 7/141 375/240.02 |
| 2014/0380357 A1* | 12/2014 | Mick, Jr. | H04N 21/812 725/32 |
| 2015/0227544 A1* | 8/2015 | Goldberg | G06F 16/162 707/692 |
| 2016/0027145 A1* | 1/2016 | Taylor | H04N 19/136 345/555 |
| 2016/0043924 A1* | 2/2016 | Cejnar | G06F 11/3006 709/224 |
| 2017/0083262 A1* | 3/2017 | Gadelrab | G06F 3/0613 |
| 2017/0223363 A1* | 8/2017 | Koteyar | H04N 19/115 |
| 2017/0257411 A1* | 9/2017 | Veeramani | H04L 65/60 |
| 2017/0358051 A1 | 12/2017 | Heynen et al. | |
| 2018/0091768 A1* | 3/2018 | Adsumilli | H04N 7/0137 |
| 2018/0302624 A1* | 10/2018 | Gadelrab | H04N 19/127 |
| 2018/0309969 A1* | 10/2018 | Schluessler | H04N 5/911 |

\* cited by examiner

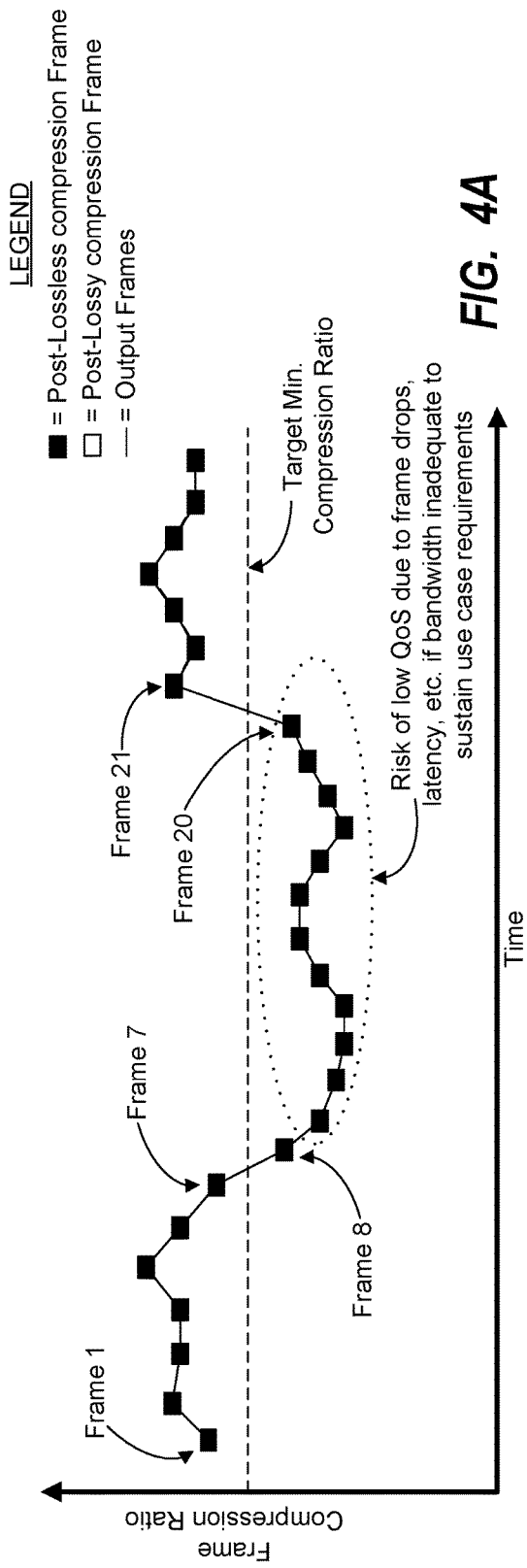
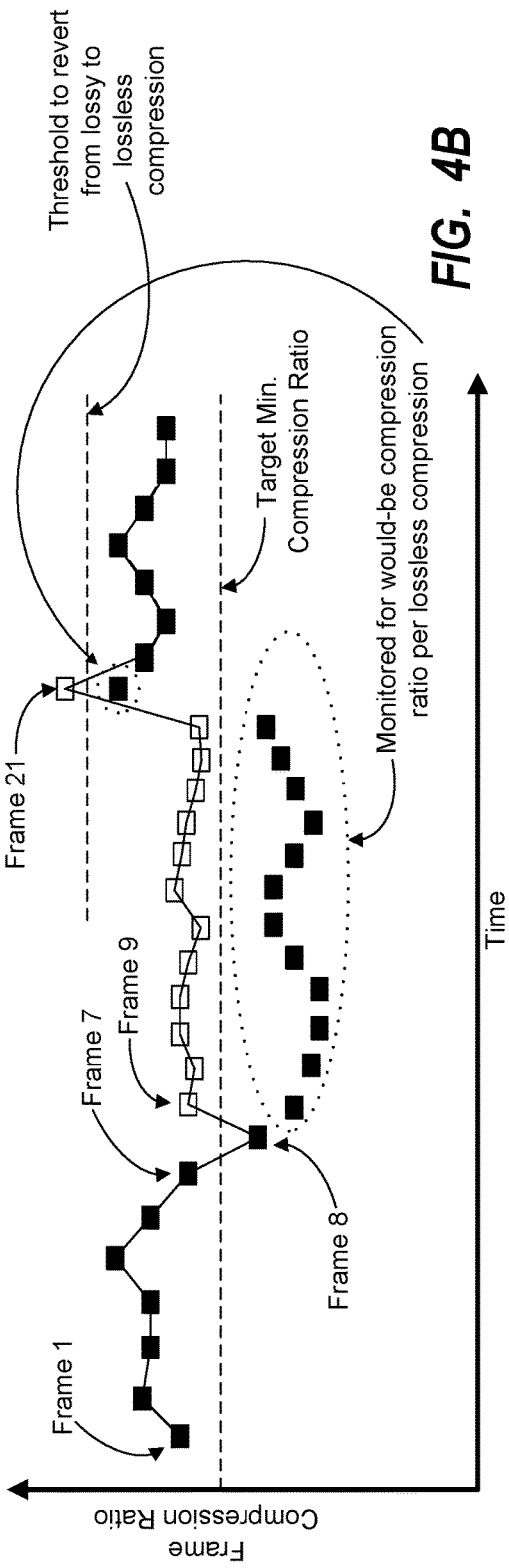
FIG. 4A
FIG. 4B

SYSTEM AND METHOD FOR INTELLIGENT DATA/FRAME COMPRESSION IN A SYSTEM ON A CHIP

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. PCDs commonly contain integrated circuits, or systems on a chip ("SoC"), that include numerous components designed to work together to deliver functionality to a user. For example, a SoC may contain any number of processing engines such as modems, central processing units ("CPUs") made up of cores, graphical processing units ("GPUs"), etc. that read and write data and instructions to and from memory components on the SoC. The data and instructions are transmitted between the devices via a collection of wires known as a bus.

The efficient sizing of bus bandwidth and memory components in a PCD is important for optimizing the functional capabilities of processing components on the SoC and guaranteeing a minimum required quality of service ("QoS") level. Commonly, the utilization of memory capacity and bus bandwidth is further optimized by compressing data so that the data requires less bus bandwidth to transmit and less space in the memory for storage. Not all data/frames compress with the same efficiency, however, and as such PCD designers are faced with a tradeoff decision—compress using a lossy compression methodology that produces a lower quality output when decompressed and, in return, benefit from a smaller memory component and bus bandwidth requirement or, alternatively, compress using a lossless compression methodology that produces a high quality output when decompressed but requires relatively larger memory components and bus bandwidths to maintain a satisfactory QoS. Either way, designers have to size busses and memory components in view of the "practical worst case" of compression, otherwise they risk reduced QoS as measured by any number of key performance indicators.

Simply stated, current systems and methods for data/frame compression known in the art dictate that PCD designers, in order to ensure delivery of an acceptable QoS level, must utilize memory components and bus bandwidths that are oversized for most use cases regardless of the compression methodology used. Therefore, there is a need in the art for a system and method that enables PCD designers to right size memory components and bus bandwidths such that the optimum compression methodology may be used for a given use case. More specifically, there is a need in the art for an intelligent compression system and method that utilizes a mixed mode compression methodology to optimize QoS in view of any one or more key performance indicators.

SUMMARY OF THE DISCLOSURE

Various embodiments of methods and systems for intelligent data compression in a portable computing device ("PCD") are disclosed. An exemplary method begins by defining a threshold value for a key performance indicator within the PCD such as, for example, a temperature reading generated by a temperature sensor within the PCD. Depending on the embodiment, the temperature reading may be associated with a skin or outer shell temperature of the PCD, a Package-on-Package ("PoP") memory device temperature, a die junction temperature, etc. Other key performance indicators may be, but are not limited to being, a compression ratio for data blocks compressed by the compression module, a voltage level, an average voltage supply level, a frame rate, and a processing time for compressing a data block.

Next, a first data block is generated by a producer component and received into a compression module according to a lossless compression mode. After being generated by the producer component, the first data block may be scaled at a default scale setting. The active level for the key performance indicator is monitored and compared to the defined threshold. Based on the comparison of the active level for the key performance indicator to the defined threshold value, the scale settings for data blocks generated by the producer component may be modified to a reduced scale setting. Subsequently, a second data block produced by the producer component may be scaled at the reduced scale setting before being compressed by the compression module according to the lossless compression algorithm. The compressed data blocks may be stored in a memory component with metadata that signals the scale settings of the data blocks prior to compression. In this way, a consumer block may later retrieve the data blocks from the memory component, decompress them using the lossless algorithm and then upscale the decompressed block using the scale factor signaled by the metadata.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIG. 4A illustrates an exemplary frame sequence in a video stream, the individual frames being of varying complexity and compressed according to a lossless compression algorithm;

FIG. 4B illustrates the exemplary frame sequence of the FIG. 4A illustration, the frames compressed according to an intelligent compression methodology that utilizes a mixed mode compression including lossless and lossy algorithms;

DETAILED DESCRIPTION

Figure 1:
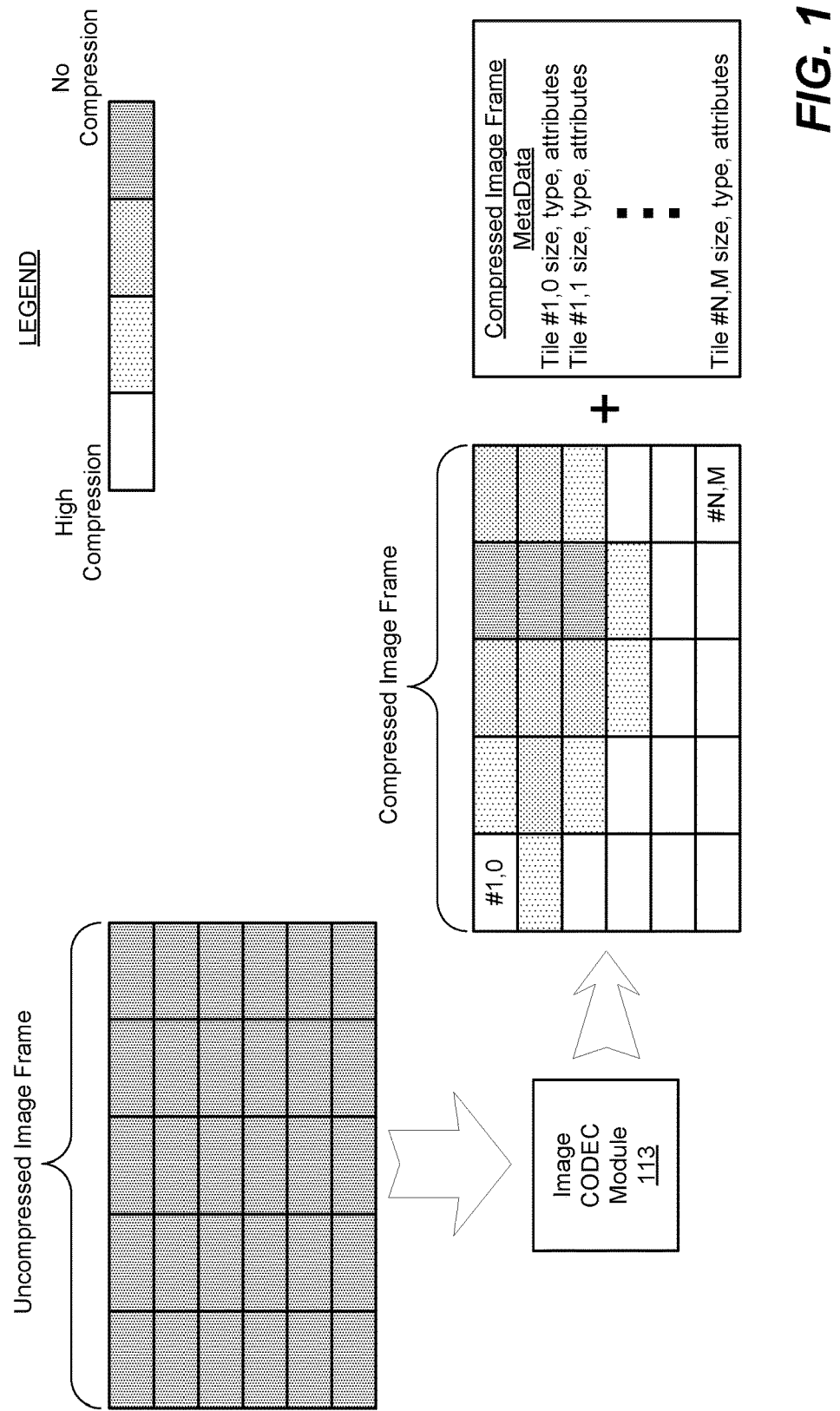
FIG. 1 illustrates the effects of compressing an image frame composed of multiple data sub-units or tiles.

The word "exemplary" is used herein to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, reference to "DRAM" or "DDR" memory components will be understood to envision any of a broader class of volatile random access memory ("RAM") and will not limit the scope of the solutions disclosed herein to a specific type or generation of RAM. That is, it will be understood that various embodiments of the systems and methods provide a solution for managing transactions of data that have been compressed according to lossless and/or lossy compression algorithms and are not necessarily limited in application to compressed data transactions associated with double data rate memory. Moreover, it is envisioned that certain embodiments of the solutions disclosed herein may be applicable to DDR, DDR-2, DDR-3, low power DDR ("LPDDR") or any subsequent generation of DRAM.

As used in this description, the terms "component," "database," "module," "block," "system," and the like are intended to refer generally to a computer-related entity, either hardware, firmware, a combination of hardware and software, software, or software in execution, unless specifically limited to a certain computer-related entity. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or chip may be comprised of one or more distinct processing components generally referred to herein as "core(s)."

In this description, the terms "engine," "processing engine," "processing component," "producer" and the like are used to refer to any component within a system on a chip ("SoC") that generates data and/or frames and transfers them over a bus to or from a memory component. As such, an engine may refer to, but is not limited to refer to, a CPU, DSP, GPU, modem, controller, camera, video recorder, etc.

In this description, the term "bus" refers to a collection of wires through which data is transmitted from a processing engine to a memory component or other device located on or off the SoC. It will be understood that a bus consists of two parts—an address bus and a data bus where the data bus transfers actual data and the address bus transfers information specifying location of the data in a memory component (i.e., address and associated metadata). The terms "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second. Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the terms "lossless" and "lossy" refer to different categories of compression algorithms or methodologies and are not meant to refer to any specific algorithm. Whether a given specific compression algorithm is "lossless" or "lossy" would be recognized by one of ordinary skill in the art. Generally speaking, and as one of ordinary skill in the art would understand, "lossless" and "lossy" are terms that describe whether or not, in the compression of a data set or frame, all original data can be recovered when the file is uncompressed. With "lossless" compression, every single bit of data that was originally in the frame remains after the frame is uncompressed, i.e., all of the information is completely restored. The Graphics Interchange File ("GIF") is an exemplary image format that provides a lossless compression. By contrast, lossy compression algorithms reduce a frame or data set by permanently eliminating certain information, especially redundant information. As such, when a file compressed with a lossy algorithm is decompressed, only a part of the original information is still there (although the user experience may not suffer for it). Lossy compression algorithms may be suitable for video and sound based use cases, for example, as a certain amount of information loss may not be detected by a user. The JPEG image file is an exemplary image format that provides a lossy compression. Using a lossy compression algorithm, designers can decide how much loss to introduce and make a trade-off between file size and output image quality.

In this description, the terms "image," "data set," "data," "frame," "image frame," "buffer," "file" and the like are used interchangeably. Although embodiments of the solution are described herein within the context of a producer component generating a data set in the form of an image frame, such as may be generated by a camera or video subsystem, it will be understood that the solution described herein is not limited in application to a frame. Rather, it is envisioned that embodiments of the solution may be applicable in any use case that may benefit from compression of data in general.

In this description, the terms "tile" and "unit" are used interchangeably to refer to a block of data that forms a subset of a larger block of data such as a frame.

In this description, the term "uncompressed" refers to a frame in its original, pre-compression state whereas the term "decompressed" refers to a frame that was first compressed from its uncompressed state using a compression algorithm and then later decompressed. Depending on the class of compression used, the data set of a decompressed frame may be identical to the data set of the frame's original, uncompressed state (lossless compression) or it may not (lossy compression).

As would be understood by one of ordinary skill in the art of frame compression, the resulting compression ratio generated by any given compression algorithm inevitably varies from frame to frame. The texture level, light condition, ISO setting, etc. in a given frame of a digitally captured video sequence may differ significantly from a different frame in the same sequence and, as such, the relative levels of compression for the frames will also differ significantly. For example, a frame in a video sequence that captures a couple of people standing and talking may be more likely to experience a high level of compression than a subsequent frame that captures the same couple of people sprinting down a street away from an explosion in the background. Simply stated, the frame with the running subjects and explosion just has a lot of data, the loss of which in compression cannot be afforded if the frame is to deliver a high quality rendering when later decompressed.

With enough large processing components, memory components, bus bandwidths and power supplies, PCD designers would not have to consider the tradeoffs of one compression algorithm versus another—they'd simply produce frames at the highest quality level possible and compress, if at all, with a lossless compression algorithm. That way, they could be assured that the QoS experienced by a user was always at its maximum possible level. But, the realities of limited form factors for PCDs force designers to weigh the tradeoffs of various compression algorithms when sizing components in the PCD to deliver a minimum acceptable QoS for all predicted use cases.

Consequently, PCD designers have typically used the "practical worst case" compression ratio when evaluating the bandwidth requirements and component sizes needed for all known use cases. The practical worst case, therefore, is the compression ratio required to maintain a minimum acceptable QoS for the most difficult frames needing compression (e.g., the frame that captures people sprinting down a street away from an explosion in the background). Using the practical worst case, designers make conservative sizing selections to ensure that the memory and bus bandwidth will always be sufficient regardless of a given frame's complexity. Notably, if the designers undersize the bandwidth, the resulting latency in processing during a problematic use case may cause frame drops, a reduction in frame rate, i.e., frames per second ("FPS"), or the like. Conversely, for all use cases that are better than the practical worst case, the system may be significantly oversized for delivery of the minimum acceptable QoS resulting in a higher cost system.

Advantageously, embodiments of the solution provide designers with the ability to "right size" producers, memory components and bus bandwidths to optimize power consumption and QoS levels across a range of use cases. Notably, embodiments of the solution leverage a mixed mode compression approach. In doing so, and as will be explained more thoroughly below in view of the figures, certain embodiments provide for use of lossless and lossy compression algorithms in a single use case, the selection and duration of the algorithms being made in view of key performance indicators. Certain other embodiments provide for a dynamic frame quality level as an input to a lossless compression block in order to create a more "compressible" frame.

Turning to FIG. 1, illustrated are the effects of compressing an image frame composed of multiple data sub-units or tiles. In this description, the various embodiments may be described within the context of an image frame made up of 256-byte tiles. Notably, however, it will be understood that the 256-byte tile sizes, as well as the various compressed data transaction sizes, are exemplary in nature and do not suggest that embodiments of the solution are limited in application to 256-byte tile sizes. Moreover, it will be understood that the reference to any specific minimum access length ("MAL") or access block size ("ABS") for a DRAM in this description is being used for the convenience of describing the solution and does not suggest that embodiments of the solution are limited in application to a DRAM device having a particular MAL requirement. As such, one of ordinary skill in the art will recognize that the particular data transfer sizes, chunk sizes, bus widths, MALs, etc. that are referred to in this description are offered for exemplary purposes only and do not limit the scope of the envisioned solutions as being applicable to applications having the same data transfer sizes, chunk sizes, bus widths, MALs etc.

Returning to the FIG. 1 illustration, an uncompressed image frame (aka, a "buffer") is depicted as being comprised of thirty uncompressed tiles or units, each of a size "K" as represented by a darkest shading. An exemplary size K may be 256 bytes, however, as explained above, a tile is not limited to any certain size and may vary according to application. As would be understood by one of ordinary skill in the art, the uncompressed image frame may be reduced in size, thereby optimizing its transfer over a bus and minimizing its impact on memory capacity, by a compressor block (depicted in FIG. 1 as Image CODEC Module 113) that applies a compression algorithm on a tile by tile basis. The result of the compression is a compressed image frame plus a metadata file, as can be seen in the FIG. 1 illustration. The compressed image frame is comprised of the tiles in the original, uncompressed image frame after having been subjected to a compression algorithm by the compression block 113.

In the uncompressed image frame, each tile may be of a size K, whereas in the compressed image frame each tile may be of a size K or less (K for no compression possible, K−1 bytes, K−2 bytes, K−3 bytes, . . . , K=1 byte). In the illustration, the various tiles that form the compressed image frame are represented by differing levels of shading depending on the extent of compression that resulted from the compression block 113 having applied its compression algorithm to the data held by the given tile. Notably, the compression block 113 creates a companion buffer for a compressed image frame metadata, as would be understood by one of ordinary skill in the art. The compressed image frame metadata contains a record of the size, type and attributes for each compressed tile in the compressed image frame. Because DRAM access may be limited to units of the minimum access length MAL the size of a given compressed tile may be represented in the metadata as the number of ABSs required to represent the compressed tile size (e.g., 1 MAL, 2 MAL, . . . n MAL). This size description in the meta-data allows a future reader of the buffer to ask the memory for only the minimum required amount of data needed to decompress each tile back to the original size K.

Figure 2:
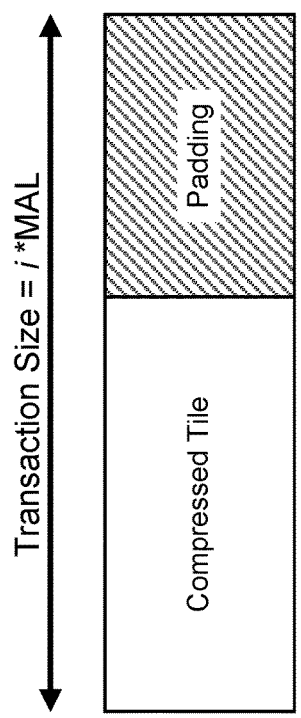
FIG. 2 illustrates a compressed data transaction with a DRAM memory component that has a required minimum access length ("MAL") per transaction.

FIG. 2 illustrates a compressed data transaction with a DRAM memory component that meets the requirement for each transaction to be an integer-multiple of the minimum access length ("MAL") per transaction. As can be understood from the FIG. 2 illustration, a compressed tile may be of a length that is less than an integer multiple of the minimum access length requirement for the DRAM in which it is stored. Consequently, a request for the compressed data requires a transaction that includes a certain amount of useless data, or "padding," needed to meet the integer-multiple of MAL requirement. The padding, which carries no information, is added to the compressed tile data to make the transaction size an integer multiple of the system MAL (i*MAL). An exemplary MAL may be 32 bytes or 64 bytes, depending on the particular chip technology (such as LPDDR2, LPDDR3, LPDDR4, etc.) and the memory bus width (×16, ×32, ×64). As an example, a compressed tile having a 63 byte size may be padded with 1 byte of padding data in order to make a complete 64 byte transaction size (2×32 B MAL or 1×64 B MAL). Similarly, a compressed tile having a 65 byte size may be padded with 31 bytes of the MAL is 32 Bytes (3×32 B MAL) or 63 bytes of padding data if MAL is 64 bytes in order to make a complete 128 byte transaction size (2×64 B MAL). Note that in the above examples, the difference in the compressed tile sizes is a mere 2 bytes; however, because the 65 byte compressed tile is over 64 bytes, a transaction of it must include significantly more padding.

Figure 3:
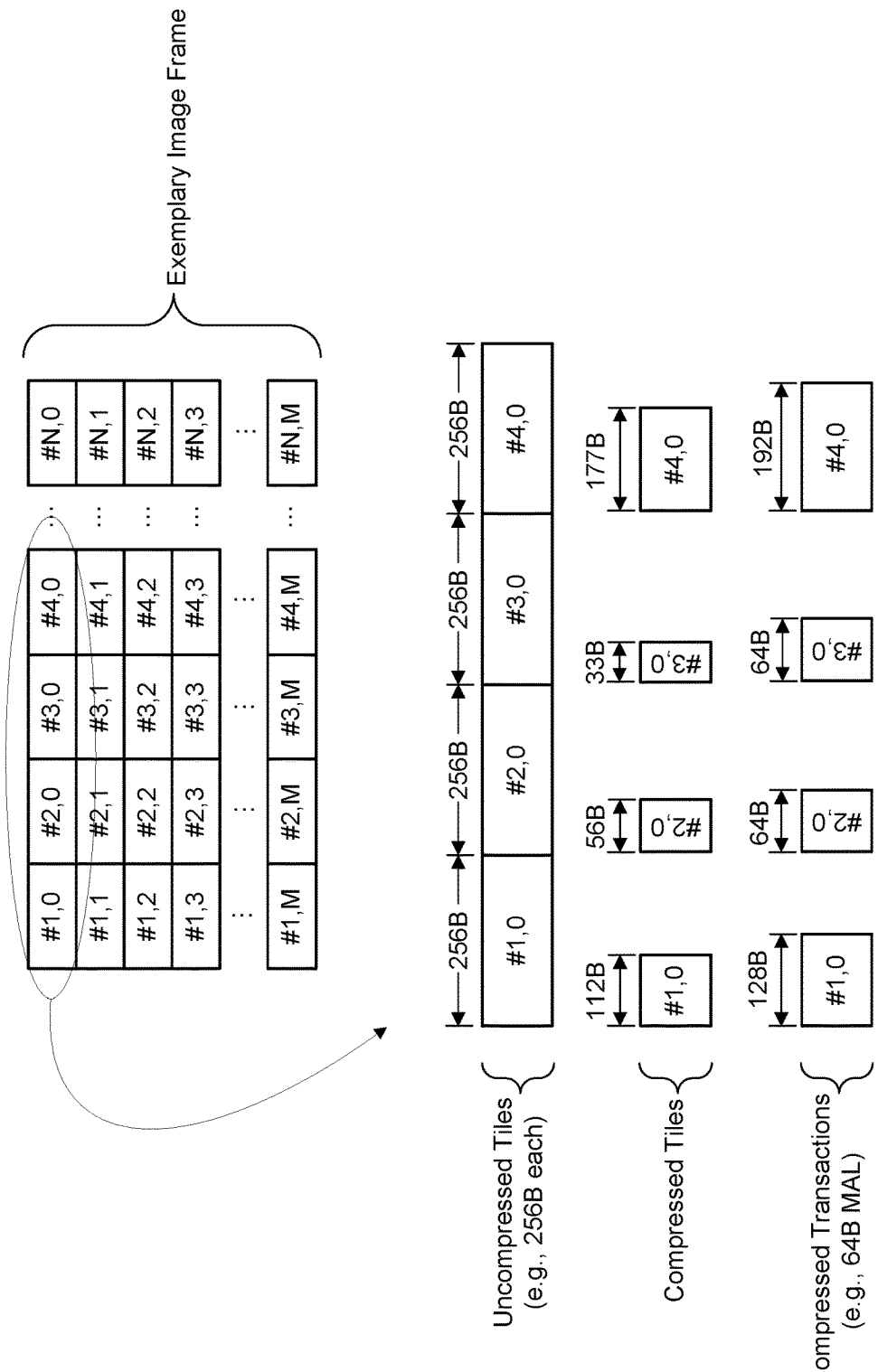
FIG. 3 illustrates a series of compressed data transactions associated with an exemplary image frame.

FIG. 3 illustrates a series of compressed data transactions associated with an exemplary image frame. Notably, the transactions or units in the FIG. 3 illustration may be considered as having been compressed according to either a lossless or a lossy compression algorithm (as well as those units depicted in the FIG. 1 and FIG. 2 illustrations).

The image frame is shown with "N" columns and "M" rows of tiles. The first four sequential tiles in the first row of tiles are illustrated in their uncompressed lengths, compressed lengths, and transaction lengths (compressed lengths plus padding) according to methods known in the art. The illustration is made within the context of the first four sequential tiles for convenience of illustration—the concepts depicted are relevant to groups of tiles other than the first four sequential tiles in a first row of tiles of an image frame, as would be understood by one of ordinary skill in the art.

Looking to the exemplary four sequential tiles in their uncompressed states, each tile (#1,0; #2,0; #3,0; #4,0) is of a 256 byte length (other lengths are envisioned). When compressed, the exemplary four sequential tiles have lengths of 112 bytes, 56 bytes, 33 bytes and 177 bytes, respectively. Assuming the MAL is 64 bytes, the transaction lengths for each of the exemplary four sequential tiles, respectively, may be 128 bytes (112 bytes compressed data plus 16 bytes padding), 64 bytes (56 bytes compressed data plus 8 bytes padding), 64 bytes (33 bytes compressed data plus 31 bytes padding) and 192 bytes (177 bytes compressed data plus 15 bytes padding). Notably, to transact all four of the exemplary sequential tiles, methods known in the art make four transactions—one for each compressed tile.

FIG. 4A illustrates an exemplary frame sequence in a video stream, the individual frames being of varying complexity and compressed according to a lossless compression algorithm. FIG. 4B, which will be described in conjunction with the FIG. 4A graph, illustrates the exemplary frame sequence of the FIG. 4A illustration, the frames compressed according to an intelligent compression methodology that utilizes a mixed mode compression including lossless and lossy algorithms. Notably, although the blocks in the FIG. 4 illustration are referred to as frames, it is envisioned that the blocks may also represent tiles within a frame. That is, it is envisioned that embodiments of the solution may be implemented on a frame by frame basis or, if so configured, implemented on a tile by tile basis. As such, the scope of the solution described herein will not be limited to application at the frame level only as embodiments of the solution may also be applied at the tile level.

As can be understood from the legend associated with FIG. 4, those frames depicted as a solid block are frames compressed according to a lossless compression algorithm whereas those frames depicted with a transparent block are frames compressed according to a lossy compression algorithm. Those frames connected by solid lines are those frames which form the sequence of frames that were generated, compressed, and output to a memory device (such as a DDR memory component, for example). The "y-axis" on both the FIG. 4A and FIG. 4B graphs represents compression ratio of the frames while the "x-axis" represents time.

Referring first to the FIG. 4A graph, a producer of frames, such as a camera or video subsystem for example, is generating sequential frames that are compressed according to a lossless compression algorithm. For the first seven frames beginning with Frame 1, the compression ratio of the frames is above a minimum target compression ratio threshold as represented by the horizontal dashed line in the graph. As such, for the first seven frames, the complexity of the originally produced frame was such that application of a lossless compression algorithm did not produce a compression ratio so low as to overburden system bandwidth and detrimentally impact QoS levels. Beginning with Frame 8 and continuing to Frame 20, however, the relative complexity of the originally produced frames increased such that the lossless compression algorithm was unable to reduce the frame sizes to a level higher than the desired target minimum compression ratio. The relative complexity of the originally produced frames reduces at Frame 21 such that the lossless compression algorithm being applied reduces the size of the frames adequately to maintain a compression ratio above the target line for Frames 8 through 20 in the FIG. 4A illustration, which were compressed according to a lossless compression algorithm that was unable to reduce the frame sizes beyond a target minimum compression ratio, there is a risk of an unacceptably low QoS experienced by a user. The inadequate bandwidth to accommodate Frames 8 through 20 may cause the system to respond by dropping one or more of the frames, increasing latency such that the effective frame rate is lowered, etc.

Referring to the FIG. 4B graph, the same sequence of originally produced frames illustrated in the FIG. 4A graph are compressed using an intelligent compression methodology according to an embodiment of the solution. Like in the FIG. 4A graph, Frames 1 through 7 are compressed according to a lossless compression algorithm. Frame 8, with its relative complexity in its uncompressed state, is minimally compressed using the lossless compression algorithm and, as such, exhibits a compression ratio below the target minimum compression ratio. In response to the Frame 8 compression ratio, Frame 9 may be compressed using a lossy compression algorithm that generates a compression ratio in excess of the target minimum. The frame sequence continues with subsequent frames being compressed according to the lossy compression algorithm until, at Frame 21, it is recognized that the preferred lossless compression algorithm would have produced an acceptable compression ratio. At such point, the mixed mode methodology defaults back to the lossless compression algorithm and continues compression at Frame 22 using the lossless algorithm.

Detection of the reduced complexity in Frame 21 can be achieved in multiple ways. One example would be to encode each frame/tile in a lossless manner and record the resulting compression ratio while not writing the actual lossless compressed data to the storage device or DRAM; once the recorded compression frame over a frame is higher than the target minimum, the system may switch to using lossless compression for frame 22 as shown in FIG. 4B. Alternatively, the detection of the reduced complexity in Frame 21 can be achieved by examining the compression ratio of the lossy frame. For a low complexity frame, the lossy compression ratio will be significantly higher than that that for a high complexity frame. The system can then use a predefined threshold for lossy compression ratio to indicate the system may switch to using lossless compression once that lossy compression ratio threshold is exceeded for a given frame (for example for frame 22 as shown in FIG. 4B).

Advantageously, by using the mixed mode approach, an embodiment of an intelligent compression solution may minimize the number of frames in a sequence that are compressed to a compression ratio below the target minimum compression ratio (e.g., Frame 8 in the FIG. 4B graph) while also minimizing the number of frames in the sequence that are compressed using a lossy compression algorithm when a lossless compression algorithm would have produced an acceptable compression ratio (e.g., Frame 21 in the FIG. 4B graph).

Figure 5:
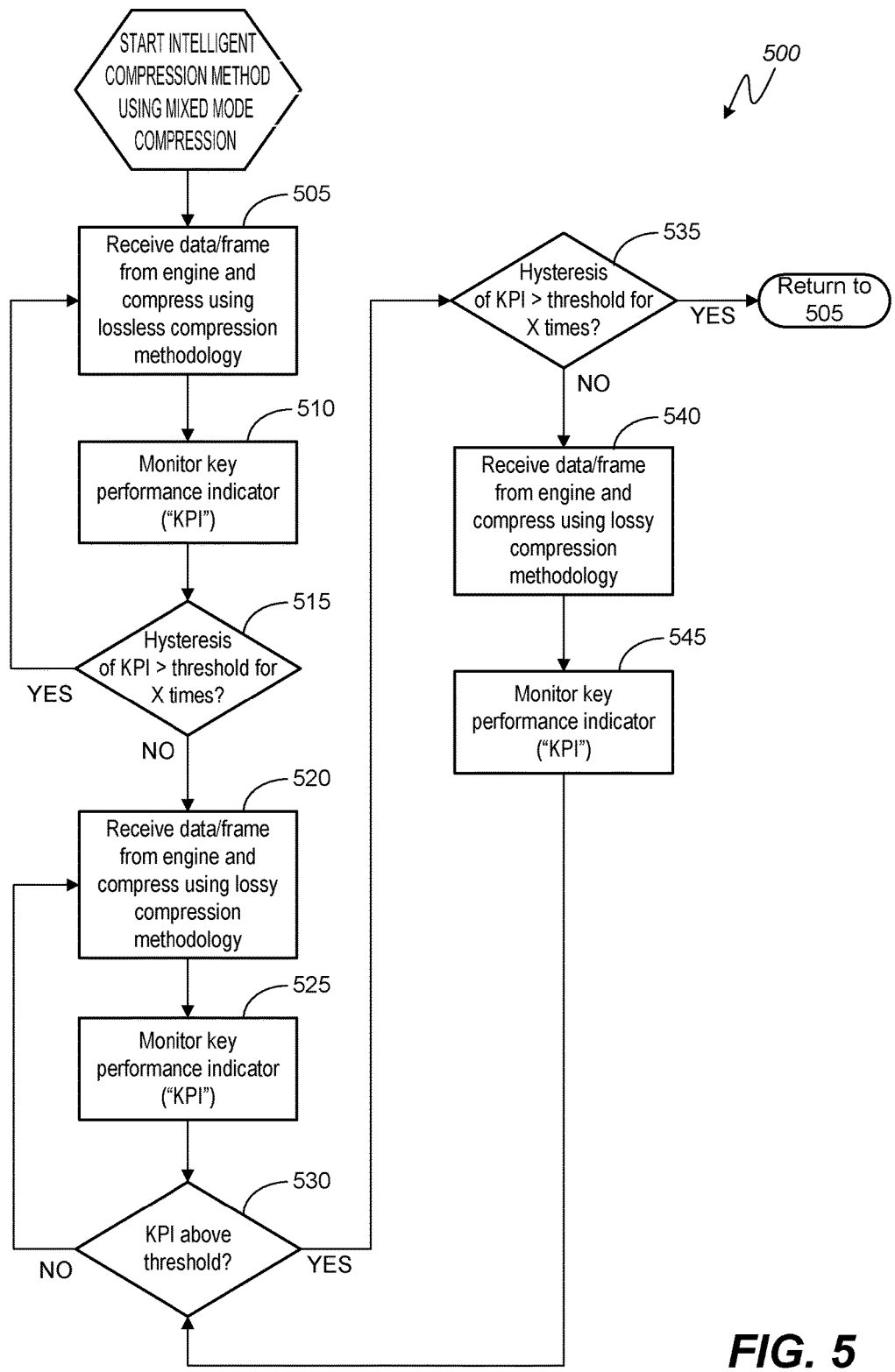
FIG. 5 is a logical flowchart illustrating an intelligent compression method that utilizes the mixed mode compression approach of FIG. 4B in view of any one or more key performance indicators.

FIG. 5 is a logical flowchart illustrating an intelligent compression method 500 that utilizes the mixed mode compression approach of FIG. 4B in view of any one or more key performance indicators ("KPI") such as, but not limited to, minimum target compression ratio, bandwidth utilization, voltage level, frame rate ("FPS"), compression latency, etc. Notably, the mixed mode compression approach illustrated by the FIG. 4B graph was described using the compression ratio of the output frames as the KPI, however, it is envisioned that the same methodology may be employed using KPIs other than compression ratio as the trigger for toggling compression modes.

Beginning at block 505, an originally produced frame may be received into an image CODEC 113 that comprises one or more lossless compression blocks and one or more lossy compression blocks. At block 505, the received frame is compressed using the default or preferred lossless compression block. Next, at block 510, the relevant KPI is monitored to determine if the QoS remains at an acceptable level and, at decision block 515, the monitored KPI is compared to a predetermined threshold. If the KPI is above (or below, as the case might be) the predetermined threshold, i.e., the KPI is at an acceptable level, then the method 500 may follow the "YES" branch back to block 505 and continue compression of incoming uncompressed frames using the lossless compression algorithm. If, however, the monitored KPI is not at an acceptable level when compared to the predetermined threshold, then the "NO" branch is followed from decision block 515 to block 520. In an exemplary implementation, the "NO" branch is followed immediately after the first instance of a KPI at an unacceptable level is encountered. In other exemplary implementations, a hysteresis is added to the "NO" decision where the KPI has to be unacceptable for a programmable sequence of X consecutive times or for X times in a window of Y consecutive sequences before the "NO" branch is invoked.

At block 520, a next produced uncompressed frame is received into the CODEC 113 and compressed using a lossy compression block. Advantageously, although a frame compressed using a lossy compression algorithm may later generate a decompressed frame that is of a relatively lower quality level than the originally produced uncompressed frame, the reduced bandwidth associated with the lossy compression may cause the relevant KPI to trend back toward an acceptable level.

Next, at block 525, the relevant KPI is monitored to determine if the QoS has returned to an acceptable level and, at decision block 530, the monitored KPI is compared to a predetermined threshold. If the KPI has not returned to an acceptable level, then the method 500 may follow the "NO" branch back to block 520 and continue compression of incoming uncompressed frames using the lossy compression algorithm. If, however, the monitored KPI indicates that the KPI may have returned to an acceptable level when compared to the predetermined threshold, then the "YES" branch is followed from decision block 530 to decision block 505.

At decision block 535, the method 500 may consider whether enough frames have been generated using the lossy compression algorithm to justify returning to the lossless compression algorithm. Although some embodiments of the solution may trigger reversion back to the preferred lossless compression mode as soon as the KPI indicates an acceptable level, it is envisioned that other embodiments may include a hysteresis consideration to mitigate the probability that the KPI may bounce back and forth across the threshold and, in doing so, trigger excessive events of toggling between lossless and lossy modes. In an exemplary implementation, the "YES" branch is followed immediately after the first instance of a KPI above a threshold is encountered. For other exemplary implementations, a hysteresis is added to the "YES" decision where the KPI has to be acceptable for a programmable sequence of K consecutive times or for K times in a window of L consecutive sequences before the "YES" branch is invoked.

Returning to the method 500 at decision block 535, if a predetermined number of frames have been compressed using the lossy compression while the KPI is at an acceptable level when compared to the threshold, the "YES" branch may be followed and the method returned to block 505 where the lossless compression algorithm will be applied to the next input uncompressed frame. If, however, at decision block 535 a predetermined number of frames have not been compressed using the lossy compression algorithm while the KPI remains at an acceptable level, the "NO" branch may be followed to block 540 and the next uncompressed frame received and compressed using the lossy compression block. At block 545 the KPI is monitored and the method 500 loops back to decision block 530.

In this way, the embodiment of the solution for an intelligent compression method using a mixed mode compression approach may compromise on the future quality of some decompressed frames in order to optimize QoS as quantified by the relevant KPI or KPIs.

Figure 6:
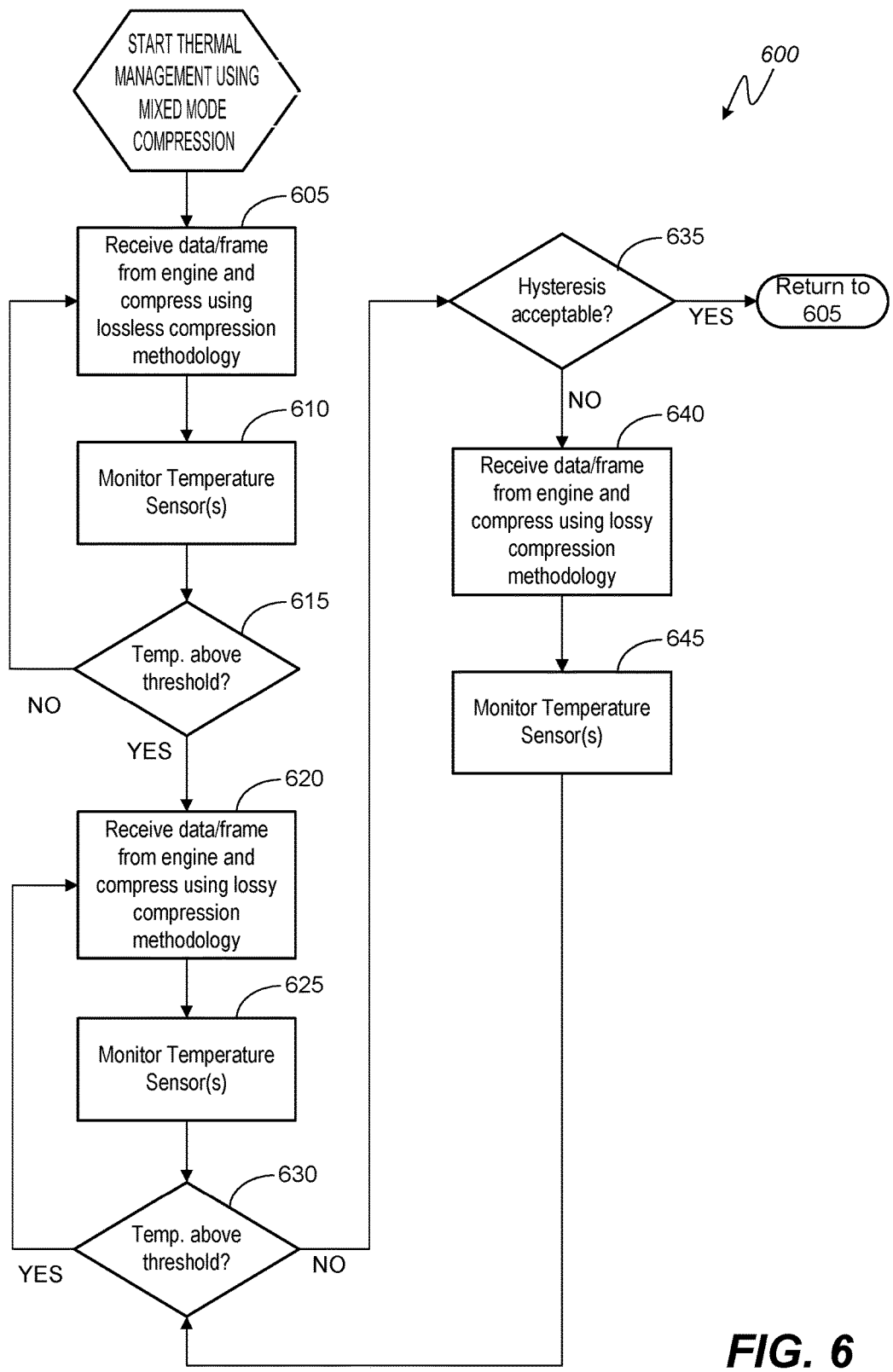
FIG. 6 is a logical flowchart illustrating an intelligent compression method that utilizes the mixed mode compression approach of FIG. 4B in view of thermal energy measurements and thresholds.

FIG. 6 is a logical flowchart illustrating an intelligent compression method 600 that utilizes the mixed mode compression approach of FIG. 4B in view of thermal energy measurements and thresholds. Notably, the mixed mode compression approach illustrated by the FIG. 4B graph was described using the compression ratio of the output frames as the trigger for determining when to toggle between lossless and lossy compression modes, however, it is envisioned that the same methodology may be employed in view of thermal budget constraints and/or thermal measurements as a way to mitigate and manage thermal energy generation. That is, it is envisioned that the mixed mode compression approach of FIG. 4B may be leveraged as a thermal management technique.

Beginning at block 605, an originally produced frame may be received into an image CODEC 113 that comprises one or more lossless compression blocks and one or more lossy compression blocks. At block 605, the received frame is compressed using the default or preferred lossless compression block. Next, at block 610, one or more temperature sensors are monitored to determine if thermal energy levels remain at an acceptable level and, at decision block 615, the temperature reading produced by the sensor(s) is compared to a predetermined threshold. The temperature sensor(s) monitored may be associated with a skin temperature of the PCD 100, a junction temperature of a processing core, a temperature of a PoP memory component, etc. If the temperature is below the predetermined threshold, i.e., the monitored thermal condition is at an acceptable level, then the method 600 may follow the "NO" branch back to block 605 and continue compression of incoming uncompressed frames using the lossless compression algorithm. If, however, the monitored thermal condition is not at an acceptable level when compared to the predetermined threshold, then the "YES" branch is followed from decision block 615 to block 620. An alternative implementation may choose not to take the "YES" branch immediately after the thermal KPI is met but rather wait until the thermal KPI is above a threshold for a predetermined period of time prior to taking the "YES" branch.

At block 620, a next produced uncompressed frame is received into the CODEC 113 and compressed using a lossy compression block. Advantageously, although a frame compressed using a lossy compression algorithm may later generate a decompressed frame that is of a relatively lower quality level than the originally produced uncompressed frame, the reduced bandwidth associated with the lossy compression may decrease power consumption and cause the monitored thermal condition to trend back toward an acceptable level.

Next, at block 625, the temperature sensor(s) are monitored to determine if the thermal condition has returned to an acceptable level and, at decision block 630, the temperature readings are compared to a predetermined threshold. If the thermal condition monitored by the temperature sensor(s) has not returned to an acceptable level, then the method 600 may follow the "YES" branch back to block 620 and continue compression of incoming uncompressed frames using the lossy compression algorithm. If, however, the readings from the temperature sensor(s) indicate that the thermal condition may have returned to an acceptable level when compared to the predetermined threshold, then the "NO" branch is followed from decision block 630 to decision block 635.

At decision block 635, the method 600 may consider whether enough frames have been generated using the lossy compression algorithm to justify returning to the lossless compression algorithm. Although some embodiments of the solution may trigger reversion back to the preferred lossless compression mode as soon as the temperature readings indicate an acceptable level for the thermal condition being monitored, it is envisioned that other embodiments may include a hysteresis consideration to mitigate the probability that the thermal condition may bounce back and forth across the threshold and, in doing so, trigger excessive events of toggling between lossless and lossy modes.

Returning to the method 600 at decision block 635, if a predetermined number of frames have been compressed using the lossy compression, or if a predetermined amount of time has elapsed, while the thermal condition associated with the temperature sensor(s) is at an acceptable level when compared to the threshold, the "YES" branch may be followed and the method returned to block 605 where the lossless compression algorithm will be applied to the next input uncompressed frame. If, however, at decision block 635 a predetermined number of frames have not been compressed using the lossy compression algorithm, or a predetermined amount of time has not elapsed, while the thermal condition remains at an acceptable level, the "NO" branch may be followed to block 640 and the next uncompressed frame received and compressed using the lossy compression block. At block 645 the thermal condition is monitored using temperature readings generated by the temperature sensor(s) and the method 600 loops back to decision block 630.

In this way, the embodiment of the solution for an intelligent compression method using a mixed mode compression approach may compromise on the future quality of some decompressed frames in order to mitigate detrimental thermal energy generation and subsequently the temperature of the device.

Figure 7:
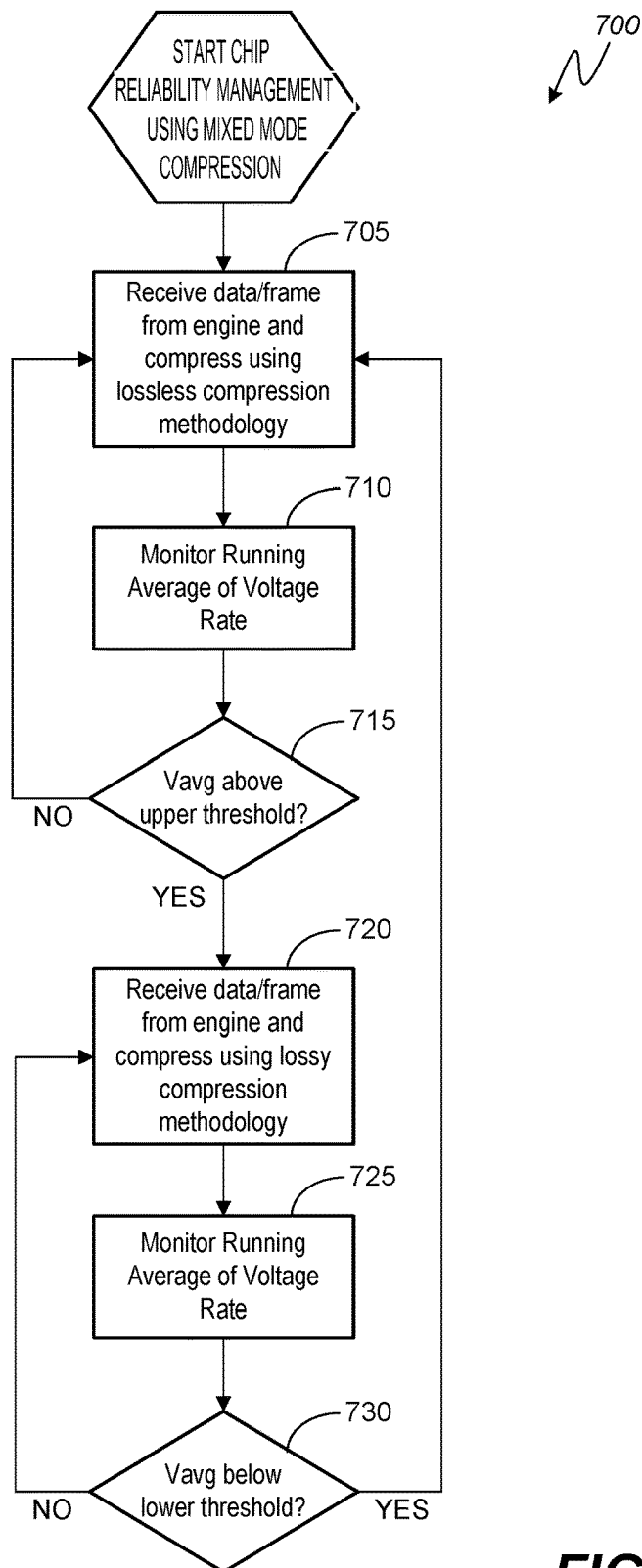
FIG. 7 is a logical flowchart illustrating an intelligent compression method that utilizes the mixed mode compression approach of FIG. 4B in view of a system reliability target associated with average voltage settings.

FIG. 7 is a logical flowchart illustrating an intelligent compression method 700 that utilizes the mixed mode compression approach of FIG. 4B in view of a system reliability target associated with average voltage settings. Notably, the mixed mode compression approach illustrated by the FIG. 4B graph was described using the compression ratio of the output frames as the trigger for determining when to toggle between lossless and lossy compression modes, however, it is envisioned that the same methodology may be employed in view of a system reliability target associated with average voltage settings. That is, it is envisioned that the mixed mode compression approach of FIG. 4B may be leveraged as a technique to maintain an average voltage supply between an upper and lower threshold. As one of ordinary skill in the art would understand, to ensure reliability of a chip 102 (FIGS. 15, 17) it may be desirable to keep the average voltage supply below a maximum average but not so far below that the average QoS experienced by a user unnecessarily suffers.

Beginning at block 705, an originally produced frame may be received into an image CODEC 113 that comprises one or more lossless compression blocks and one or more lossy compression blocks. At block 705, the received frame is compressed using the default or preferred lossless compression block. Next, at block 710, one or more voltage sensors are monitored for calculation of a running average of the voltage supplied to the chip 102 over time. Based on the running average, the method 700 may determine if the long term reliability of the chip is acceptable by, at decision block 715, comparing the voltage average to a predetermined threshold. If the voltage supply average is below the predetermined threshold, i.e., the predicted long term reliability of the chip is at an acceptable level, then the method 700 may follow the "NO" branch back to block 705 and continue compression of incoming uncompressed frames using the lossless compression algorithm. If, however, the voltage supply average is not at an acceptable level when compared to the predetermined threshold, then the "YES" branch is followed from decision block 715 to block 720.

At block 720, a next produced uncompressed frame is received into the CODEC 113 and compressed using a lossy compression block. Advantageously, although a frame compressed using a lossy compression algorithm may later generate a decompressed frame that is of a relatively lower quality level than the originally produced uncompressed frame, the reduced bandwidth associated with the lossy compression may decrease power consumption and cause the voltage supply average to trend back toward an acceptable level.

Next, at block 725, the voltage sensor(s) are monitored to determine if the voltage supply average has returned to an acceptable level and, at decision block 730, the voltage supply average is compared to a predetermined low threshold. If the voltage supply average calculated from the monitored voltage sensor(s) remains above the lower threshold, then the method 700 may follow the "NO" branch back to block 720 and continues compression of incoming uncompressed frames using the lossy compression algorithm. If, however, the voltage supply average indicates that the average voltage supply to the chip 102 has fallen below the low average threshold, then the "YES" branch is followed from decision block 730 back to block 705 where lossless compression is applied to the next incoming uncompressed frame.

In this way, the embodiment of the solution for an intelligent compression method using a mixed mode compression approach may compromise on the future quality of some decompressed frames in order to maintain an average voltage supply in a range associated with a target chip reliability goal.

Figure 8:
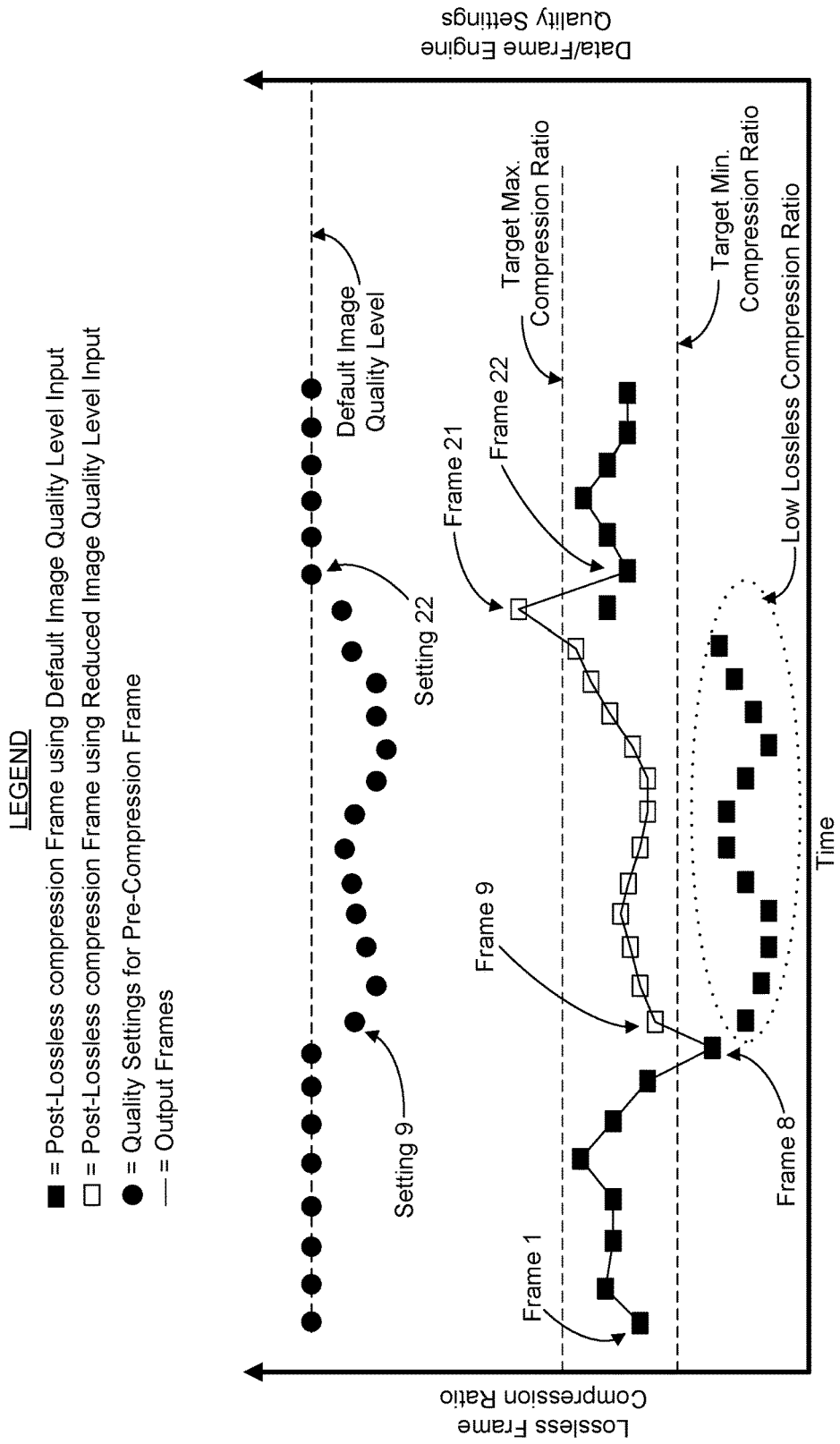
FIG. 8 illustrates an exemplary frame sequence in a video stream, the individual frames being of varying complexity and compressed according to a lossless compression algorithm after dynamic adjustment of an image quality setting.

FIG. 8 illustrates an exemplary frame sequence in a video stream, the individual frames being of varying complexity and compressed according to a lossless compression algorithm after dynamic adjustment of an image quality setting. Notably, although the blocks in the FIG. 8 illustration are referred to as frames, it is envisioned that the blocks may also represent tiles within a frame. That is, it is envisioned that embodiments of the solution may be implemented on a frame by frame basis or, if so configured, implemented on a tile by tile basis. As such, the scope of the solution described herein will not be limited to application at the frame level only as embodiments of the solution may also be applied at the tile level.

As can be understood from the legend associated with FIG. 8, those frames depicted as a solid square block are frames compressed according to a lossless compression algorithm when the uncompressed frame was generated using a default "high" image quality level. By contrast, those frames depicted with a transparent square block are frames compressed according to a lossless compression algorithm when the uncompressed frame was generated using an adjusted image quality level that is "lower" in quality relative to the default image quality level. The solid circles indicate the image quality level at which the uncompressed frame is being generated by a producer, such as a camera or video subsystem. Those frames connected by solid lines are those frames which form the sequence of frames that were generated in accordance with the active image quality level setting, compressed, and output to a memory device (such as a DDR memory component, for example). The left-side "y-axis" on FIG. 8 graph represents compression ratio of the output frames, the right-side "y-axis" represents the image quality level settings for the producer of uncompressed frames, and the "x-axis" represents time.

Referring to the FIG. 8 graph, a producer of frames, such as a camera or video subsystem for example, is generating sequential frames at a default image quality level that are then compressed according to a lossless compression algorithm. For the first seven frames beginning with Frame 1, the compression ratio of the frames is above a minimum target compression ratio threshold as represented by the horizontal dashed lines in the graph. As such, for the first seven frames, the complexity of the originally produced frame at the default image quality setting was such that application of a lossless compression algorithm did not produce a compression ratio so low as to overburden system bandwidth and detrimentally impact QoS levels. Beginning with Frame 8 and continuing to Frame 20, however, the relative complexity of the frames when produced at the default image quality level was such that the lossless compression algorithm was unable to significantly reduce the frame sizes. In response, the image quality level setting associated with Frame 9 may be reduced such that the relative complexity of the originally produced uncompressed frame is lowered so that the lossless compression algorithm may adequately maintain a compression ratio above the target line.

It is envisioned that in some embodiments of the solution any number and/or combination of "knobs" may be adjusted within the image producer in order to lower the image quality level of the uncompressed image upstream of the CODEC module 113. For example, image quality settings such as, but not limited to, texture settings, color bit resolution, fovea settings, etc. may be adjusted in order to lower the complexity of an uncompressed frame generated by the producer.

It is also envisioned that in some embodiments of the solution the image quality level of the uncompressed image may be effectively lowered by the producer through scaling down the uncompressed image according to a predetermined horizontal, vertical and/or bidirectional scaling factor. Once scaled down, the now "smaller" uncompressed image may be compressed by the CODEC module 113 according to a lossless compression algorithm and then transmitted to the storage device or DRAM 112. The predetermined scaling factor used to "scale down" the uncompressed image may be stored in the meta data associated with the compressed image. In such embodiments of the solution, the dynamic reduction in image quality level requires cooperation of both the producer block and the consumer block as the consumer block would be configured to "scale up" the image by the same predetermined scaling factor once the image is decompressed. Again, it is envisioned that the scaling factor used by the producer block to "scale down" the uncompressed image prior to lossless compression may be provided to the consumer block via a signal embodied in the compressed image meta data associated with the compressed file (meta data illustrated in FIG. 1).

Returning to the FIG. 8 illustration, at Frame 21 the lower image quality level settings in the producer causes the lossless compression algorithm to generate a compressed frame with a compression ratio above the predetermined maximum compression ratio for low quality frames. In response, the image quality settings used to generate Frame 22 in its uncompressed form may be returned to the default settings. Moving forward in the frame sequence, the image quality settings may remain at the default levels unless and until the lossless compression algorithm again produces a compressed frame with a compression ratio below the minimum target.

Advantageously, by using the dynamic quality settings approach, an embodiment of an intelligent compression solution may minimize the number of frames in a sequence that are compressed to a compression ratio below the target minimum compression ratio (e.g., Frame 8 in the FIG. 8 graph) while also minimizing the number of frames in the sequence that are compressed from an uncompressed frame generated using lower quality settings (e.g., Frame 21 in the FIG. 8 graph).

Figure 9:
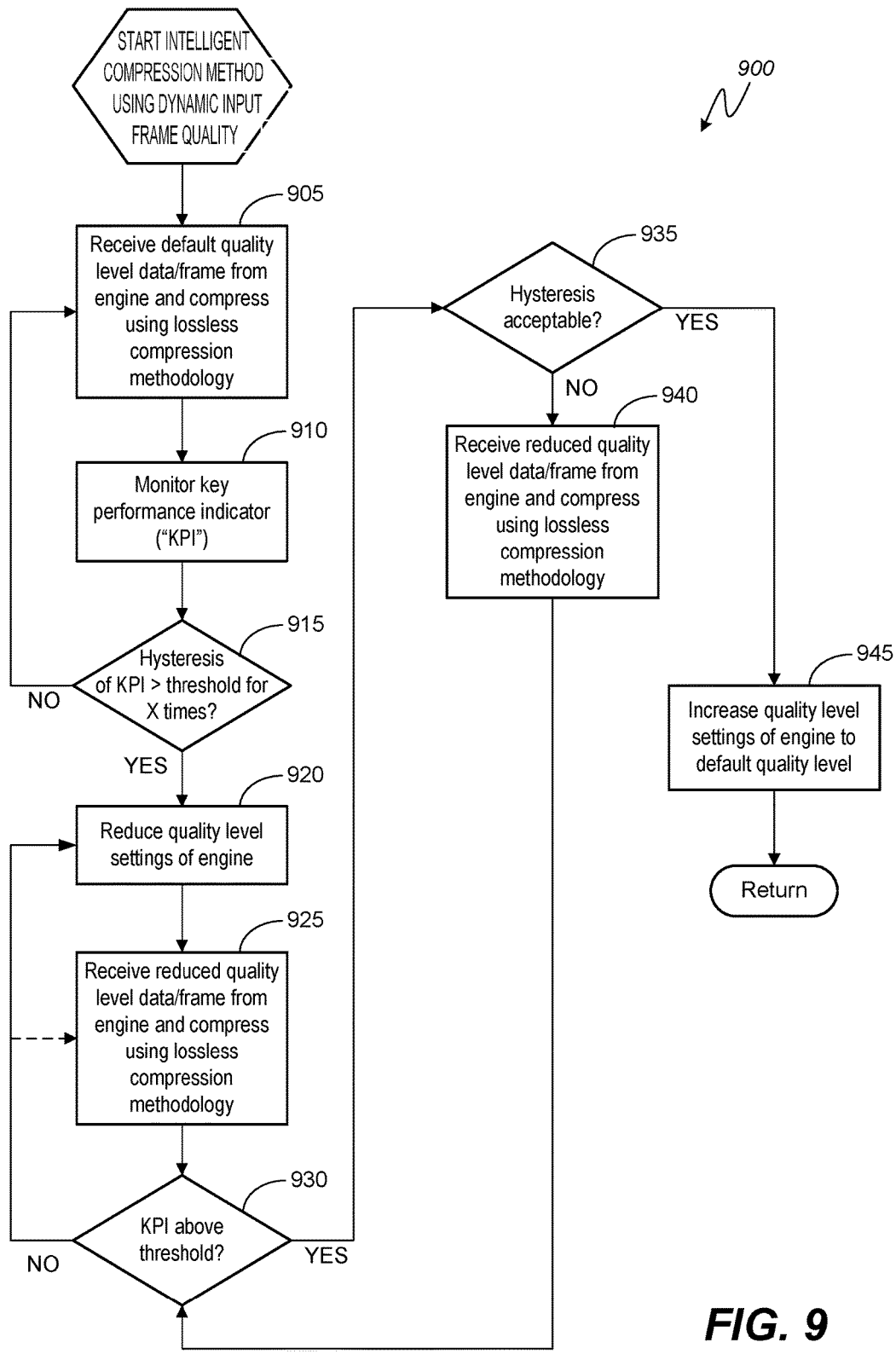
FIG. 9 is a logical flowchart illustrating an intelligent compression method that utilizes a dynamic quality input compression approach of FIG. 8 in view of any one or more key performance indicators.

FIG. 9 is a logical flowchart illustrating an intelligent compression method 900 that utilizes a dynamic quality input compression approach of FIG. 8 in view of any one or more key performance indicators ("KPI") such as, but not limited to, minimum target compression ratio, bandwidth utilization, voltage level, frame rate ("FPS"), compression latency, etc. Notably, the dynamic input frame quality approach illustrated by the FIG. 8 graph was described using the compression ratio of the output frames as the KPI, however, it is envisioned that the same methodology may be employed using KPIs other than compression ratio as the trigger for adjusting producer quality settings.

Beginning at block 905, an uncompressed frame produced according to default image quality settings may be received into an image CODEC 113 that comprises one or more lossless compression blocks and compressed accordingly. Next, at block 910, the relevant KPI is monitored to determine if the KPI remains at an acceptable level and, at decision block 915, the monitored KPI is compared to a predetermined threshold. If the KPI is above (or below, as the case might be) the predetermined threshold, i.e., the KPI is at an acceptable level, then the method 900 may follow the "NO" branch back to block 905 and continue compression of incoming uncompressed frames produced at the default image quality settings. If, however, the monitored KPI is not at an acceptable level when compared to the predetermined threshold, then the "YES" branch is followed from decision block 915 to block 920.

At block 920, a next produced uncompressed frame is produced according to reduced image quality level settings and, at block 925 received into the CODEC 113 and compressed using the lossless compression algorithm. Advantageously, although producing the uncompressed frame using lower quality level settings will effect the ultimate quality of the frame when later decompressed, the reduced bandwidth associated with the lossless compression of the relatively less complex uncompressed frame may cause the relevant KPI to trend back toward an acceptable level.

Next, at decision block 930 the monitored KPI is compared to the predetermined threshold to determine if the QoS has returned to an acceptable level. If the monitored KPI indicates that the KPI may have returned to an acceptable level when compared to the predetermined threshold, then the "YES" branch is followed from decision block 930 to decision block 935. If, however, the KPI has not returned to an acceptable level, then the method 900 may follow the "NO" branch back to block 920 (where the image quality settings are further reduced). In an alternative embodiment (indicated by broken line between block 930 and block 925), the method may follow the "NO" branch back to block 925 (where the lowered image quality settings are maintained) instead of to block 920.

At decision block 935, the method 900 may consider whether enough frames have been compressed from uncompressed frames produced with lowered image quality settings to justify returning to the default image quality settings. Although some embodiments of the solution may trigger reversion back to the default image quality settings as soon as the KPI indicates an acceptable level, it is envisioned that other embodiments may include a hysteresis consideration to mitigate the probability that the KPI may bounce back and forth across the threshold and, in doing so, trigger excessive events of toggling between default image quality settings and lowered image quality settings.

Returning to the method 900 at decision block 935, if a predetermined number of frames have been compressed from uncompressed frames produced with lowered image quality settings to justify returning to the default image quality settings, the "YES" branch may be followed to block 945 where the image quality settings for produced uncompressed frames are returned to the default settings. If, however, at decision block 935 a predetermined number of frames have not been compressed from uncompressed frames produced with lowered image quality settings to justify returning to the default image quality settings, the "NO" branch may be followed to block 940 and the next uncompressed frame generated using reduced image quality settings before being compressed with the lossless algorithm. The method 900 loops back to decision block 930.

In this way, the embodiment of the solution for an intelligent compression method using the dynamic quality settings approach may compromise on the future quality of some decompressed frames in order to optimize QoS as quantified by the relevant KPI or KPIs.

Figure 10:
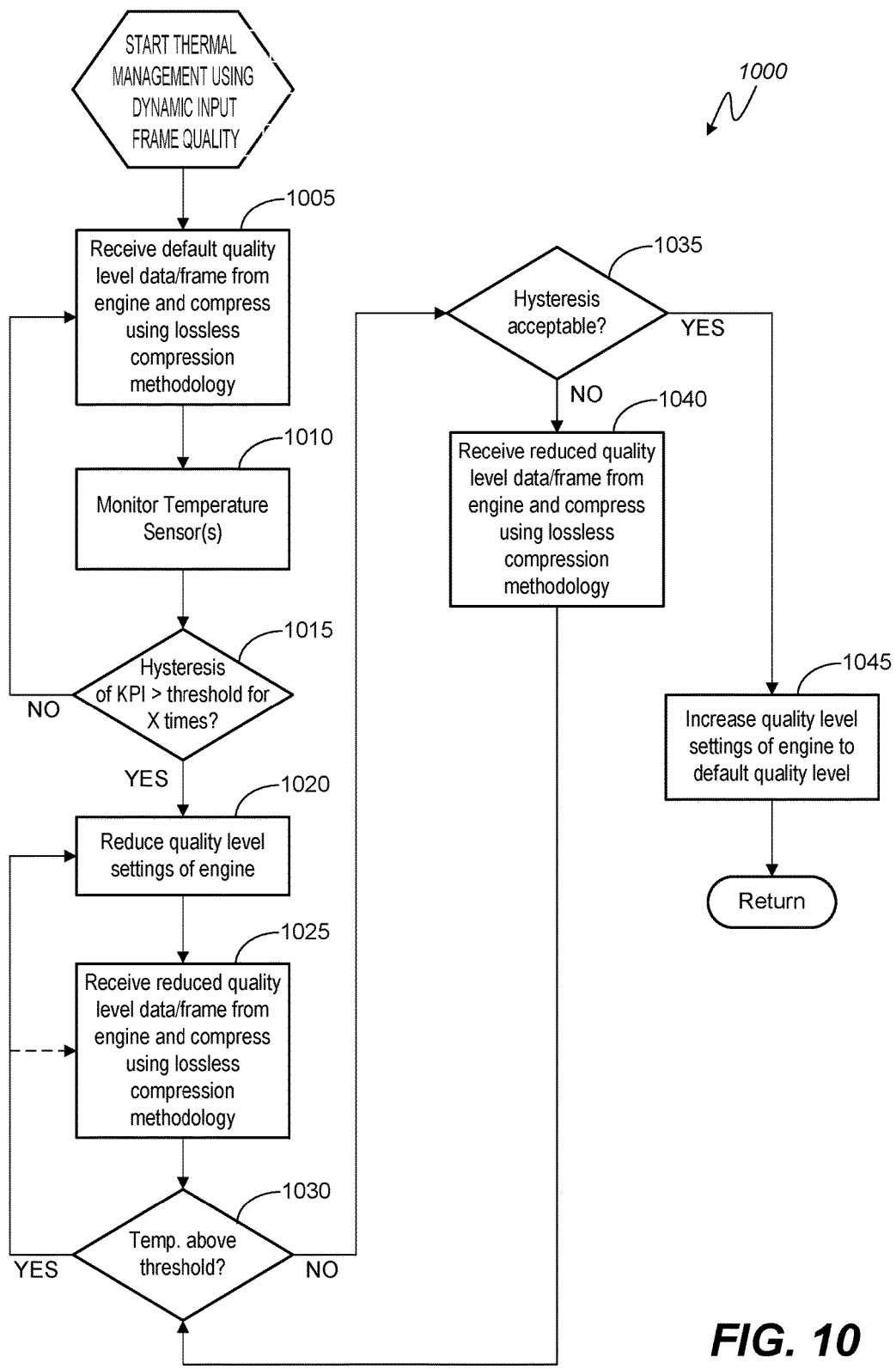
FIG. 10 is a logical flowchart illustrating an intelligent compression method that utilizes a dynamic quality input compression approach of FIG. 8 in view of thermal energy measurements and thresholds.

FIG. 10 is a logical flowchart illustrating an intelligent compression method 1000 that utilizes a dynamic quality input compression approach of FIG. 8 in view of thermal energy measurements and thresholds. Notably, the dynamic input frame quality approach illustrated by the FIG. 8 graph was described using the compression ratio of the output frames as the trigger for determining when to adjust the image quality settings of the producer, however, it is envisioned that the same methodology may be employed in view of thermal budget constraints and/or thermal measurements as a way to mitigate and manage thermal energy generation. That is, it is envisioned that the dynamic input compression approach of FIG. 8 may be leveraged as a thermal management technique.

Beginning at block 1005, an uncompressed frame produced according to default image quality settings may be received into an image CODEC 113 (FIGS. 15, 17) that comprises one or more lossless compression blocks and compressed accordingly. Next, at block 1010, one or more temperature sensors are monitored to determine if thermal energy levels remain at an acceptable level and, at decision block 1015, the temperature reading produced by the sensor(s) is compared to a predetermined threshold. The temperature sensor(s) monitored may be associated with a skin temperature of the PCD 100 (FIGS. 15, 17), a junction temperature of a processing core, a temperature of a PoP memory component, etc. If the temperature is below the predetermined threshold, i.e., the monitored thermal condition is at an acceptable level, then the method 1000 may follow the "NO" branch back to block 1005 and continue compression of incoming uncompressed frames produced at the default image quality settings. If, however, the monitored thermal condition is not at an acceptable level when compared to the predetermined threshold, then the "YES" branch is followed from decision block 1015 to block 1020.

At block 1020, a next produced uncompressed frame is produced according to reduced image quality level settings and, at block 1025 received into the CODEC 113 and compressed using the lossless compression algorithm. Advantageously, although producing the uncompressed frame using lower quality level settings will effect the ultimate quality of the frame when later decompressed, the reduced bandwidth associated with the lossless compression of the relatively less complex uncompressed frame may cause the thermal condition being monitored to trend back toward an acceptable level.

Next, at decision block 1030 the monitored thermal condition is compared to the predetermined threshold to determine if the thermal condition has returned to an acceptable level. If the monitored temperature sensor(s) reading(s) indicates that the thermal condition may have returned to an acceptable level when compared to the predetermined threshold, then the "NO" branch is followed from decision block 1030 to decision block 1035. If, however, the thermal condition has not returned to an acceptable level, then the method 1000 may follow the "YES" branch back to block 1020 (where the image quality settings are further reduced). In an alternative embodiment (indicated by broken line between block 1030 and block 1025), the method may follow the "NO" branch back to block 1025 (where the lowered image quality settings are maintained) instead of to block 1020.

At decision block 1035, the method 1000 may consider whether enough frames have been compressed from uncompressed frames produced with lowered image quality settings to justify returning to the default image quality settings. Although some embodiments of the solution may trigger reversion back to the default image quality settings as soon as the temperature sensor readings indicate that the thermal condition being monitored has returned to an acceptable level, it is envisioned that other embodiments may include a hysteresis consideration to mitigate the probability that the thermal condition may bounce back and forth across the threshold and, in doing so, trigger excessive events of toggling between default image quality settings and lowered image quality settings.

Returning to the method 1000 at decision block 1035, if a predetermined number of frames have been compressed from uncompressed frames produced with lowered image quality settings, or if a predetermined amount of time has elapsed, to justify returning to the default image quality settings, the "YES" branch may be followed to block 1045 where the image quality settings for produced uncompressed frames are returned to the default settings. If, however, at decision block 1035 a predetermined number of frames have not been compressed from uncompressed frames produced with lowered image quality settings, or if a predetermined amount of time has yet to elapse, to justify returning to the default image quality settings, the "NO" branch may be followed to block 1040 and the next uncompressed frame generated using reduced image quality settings before being compressed with the lossless algorithm. The method 1000 loops back to decision block 1030.

In this way, the embodiment of the solution for an intelligent compression method using the dynamic quality settings approach may compromise on the future quality of some decompressed frames in order to mitigate detrimental thermal energy generation.

Figure 11:
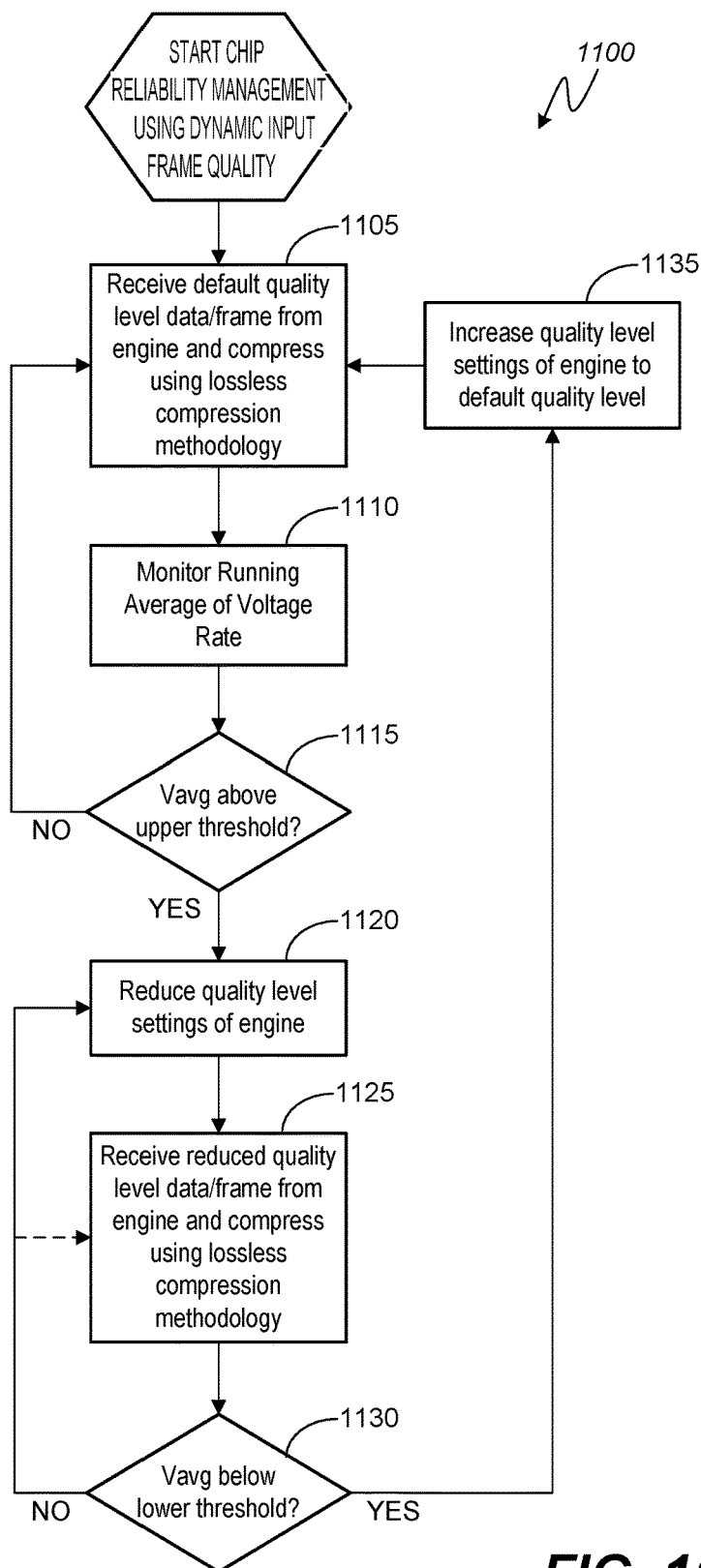
FIG. 11 is a logical flowchart illustrating an intelligent compression method that utilizes a dynamic quality input compression approach of FIG. 8 in view of a system reliability target associated with average voltage settings.

FIG. 11 is a logical flowchart illustrating an intelligent compression method 1100 that utilizes a dynamic quality input compression approach of FIG. 8 in view of a system reliability target associated with average voltage settings. Notably, the dynamic input compression approach illustrated by the FIG. 8 graph was described using the compression ratio of the output frames as the trigger for determining when to adjust the image quality settings of the producer, however, it is envisioned that the same methodology may be employed in view of a system reliability target associated with average voltage settings. That is, it is envisioned that the dynamic input compression approach of FIG. 8 may be leveraged as a technique to maintain an average voltage supply between an upper and lower threshold. As one of ordinary skill in the art would understand, to ensure reliability of a chip 102 (FIGS. 15, 17) it may be desirable to keep the average voltage supply below a maximum average but not so far below that the average QoS experienced by a user unnecessarily suffers.

Beginning at block 1105, an uncompressed frame produced according to default image quality settings may be received into an image CODEC 113 that comprises one or more lossless compression blocks and compressed accordingly. Next, at block 1110, one or more voltage sensors are monitored for calculation of a running average of the voltage supplied to the chip 102 over time. Based on the running average, the method 1100 may determine if the long term reliability of the chip is acceptable by, at decision block 1115, comparing the voltage average to a predetermined upper threshold. If the voltage supply average is below the predetermined upper threshold, i.e., the predicted long term reliability of the chip is at an acceptable level, then the method 1100 may follow the "NO" branch back to block 1105 and continue compression of incoming uncompressed frames produced using default quality settings. If, however, the voltage supply average is not at an acceptable level when compared to the predetermined upper threshold, then the "YES" branch is followed from decision block 1115 to block 1120.

At block 1120, a next uncompressed frame is produced according to reduced image quality level settings and, at block 1125 received into the CODEC 113 and compressed using the lossless compression algorithm. Advantageously, although producing the uncompressed frame using lower quality level settings will effect the ultimate quality of the frame when later decompressed, the reduced bandwidth associated with the lossless compression of the relatively less complex uncompressed frame may decrease power consumption and cause the voltage supply average to trend back toward an acceptable level.

Next, at decision block 1130, the voltage supply average is compared to a predetermined low threshold. If the voltage supply average indicates that the average voltage supply to the chip 102 has fallen below the low average threshold, then the "YES" branch is followed from decision block 1130 to block 1135. If, however, the voltage supply average calculated from the monitored voltage sensor(s) remains above the lower threshold, then the method 1100 may follow the "NO" branch back to block 1120 (where the image quality settings are further reduced). In an alternative embodiment (indicated by broken line between block 1130 and block 1125), the method may follow the "NO" branch back to block 1125 (where the lowered image quality settings are maintained) instead of to block 1120. At block 1135, the quality level settings of the producer may be increased back to the default levels. The method 1100 loops back to block 1105.

In this way, the embodiment of the solution for an intelligent compression method using the dynamic quality settings approach may compromise on the future quality of some decompressed frames in order to maintain an average voltage supply in a range associated with a target chip reliability goal.

Figure 12:
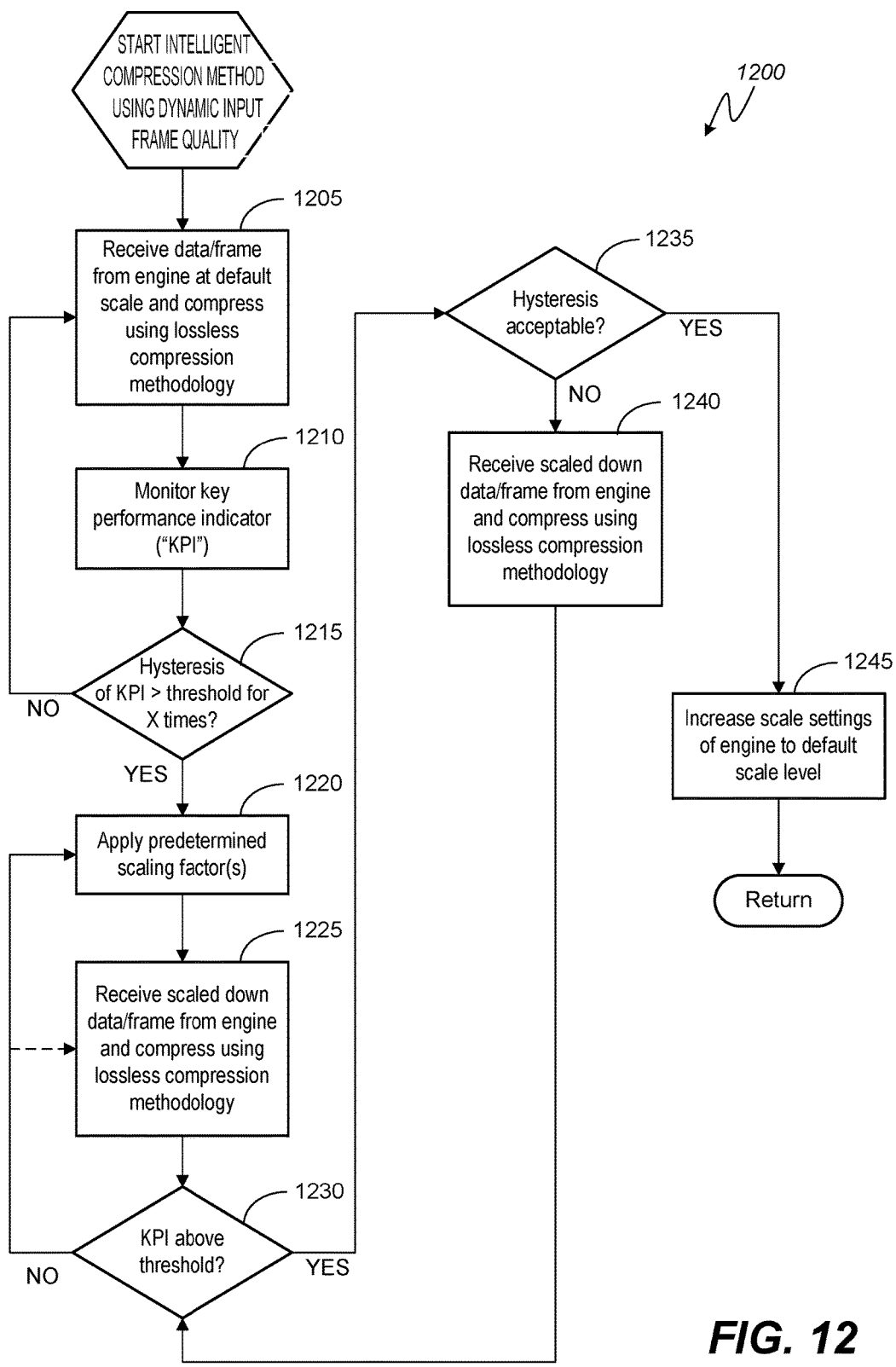
FIG. 12 is a logical flowchart illustrating an intelligent compression method that utilizes a dynamic scaling input compression approach of FIG. 8 in view of any one or more key performance indicators.

FIG. 12 is a logical flowchart illustrating an intelligent compression method 1200 that utilizes a dynamic scaling input compression approach of FIG. 8 in view of any one or more key performance indicators ("KPI") such as, but not limited to, minimum target compression ratio, bandwidth utilization, voltage level, frame rate ("FPS"), compression latency, etc. Notably, the dynamic input frame scaling approach illustrated by the FIG. 8 graph was described using the compression ratio of the output frames as the KPI, however, it is envisioned that the same methodology may be employed using KPIs other than compression ratio as the trigger for adjusting producer scale settings.

Beginning at block 1205, an uncompressed frame produced according to default scale settings may be received into an image CODEC 113 that comprises one or more lossless compression blocks and compressed accordingly. Next, at block 1210, the relevant KPI is monitored to determine if the KPI remains at an acceptable level and, at decision block 1215, the monitored KPI is compared to a predetermined threshold. If the KPI is above (or below, as the case might be) the predetermined threshold, i.e., the KPI is at an acceptable level, then the method 1200 may follow the "NO" branch back to block 1205 and continue compression of incoming uncompressed frames produced and scaled at default scaling settings. If, however, the monitored KPI is not at an acceptable level when compared to the predetermined threshold, then the "YES" branch is followed from decision block 1215 to block 1220.

At block 1220, a next produced uncompressed frame is produced and scaled down according to a predetermined scale setting(s) and, at block 1225 received into the CODEC 113 and compressed using the lossless compression algorithm. Notably, the scaling factor used to reduce the size of the uncompressed frame may be indicated in the meta data associated with the compressed frame coming out of CODEC 113 and saved in a storage device. In this way, a consumer block requesting the compressed frame from the storage device at a later time may decompress the frame and then scale it up using the appropriate scaling factor. Advantageously, the scaling down of the uncompressed frame reduces the bandwidth associated with the lossless compression of the relatively smaller uncompressed frame and, in doing so, may cause the relevant KPI to trend back toward an acceptable level.

Next, at decision block 1230 the monitored KPI is compared to the predetermined threshold to determine if the QoS has returned to an acceptable level. If the monitored KPI indicates that the KPI may have returned to an acceptable level when compared to the predetermined threshold, then the "YES" branch is followed from decision block 1230 to decision block 1235. If, however, the KPI has not returned to an acceptable level, then the method 1200 may follow the "NO" branch back to block 1220 (where the predetermined scaling factor is further reduced). In an alternative embodiment (indicated by broken line between block 1230 and block 1225), the method may follow the "NO" branch back to block 1225 (where the predetermined scaling factor is maintained) instead of to block 1220.

At decision block 1235, the method 1200 may consider whether enough frames have been compressed from scaled down uncompressed frames to justify returning to the default scale settings. Although some embodiments of the solution may trigger reversion back to the default scale settings as soon as the KPI indicates an acceptable level, it is envisioned that other embodiments may include a hysteresis consideration to mitigate the probability that the KPI may bounce back and forth across the threshold and, in doing so, trigger excessive events of toggling between default scale settings and reduced scale settings.

Returning to the method 1200 at decision block 1235, if a predetermined number of frames have been compressed from scaled down uncompressed frames to justify returning to the default scale settings, the "YES" branch may be followed to block 1245 where the scale settings for uncompressed frames are returned to the default settings. If, however, at decision block 1235 a predetermined number of frames have not been compressed from scaled down uncompressed frames to justify returning to the default scale settings, the "NO" branch may be followed to block 1240 and the next uncompressed frame scaled down according to the predetermined scaling factor before being compressed with the lossless algorithm. The method 1200 loops back to decision block 1230.

In this way, the embodiment of the solution for an intelligent compression method using a dynamic scale settings approach may reduce the size of uncompressed frames in order to optimize QoS as quantified by the relevant KPI or KPIs.

Figure 13:
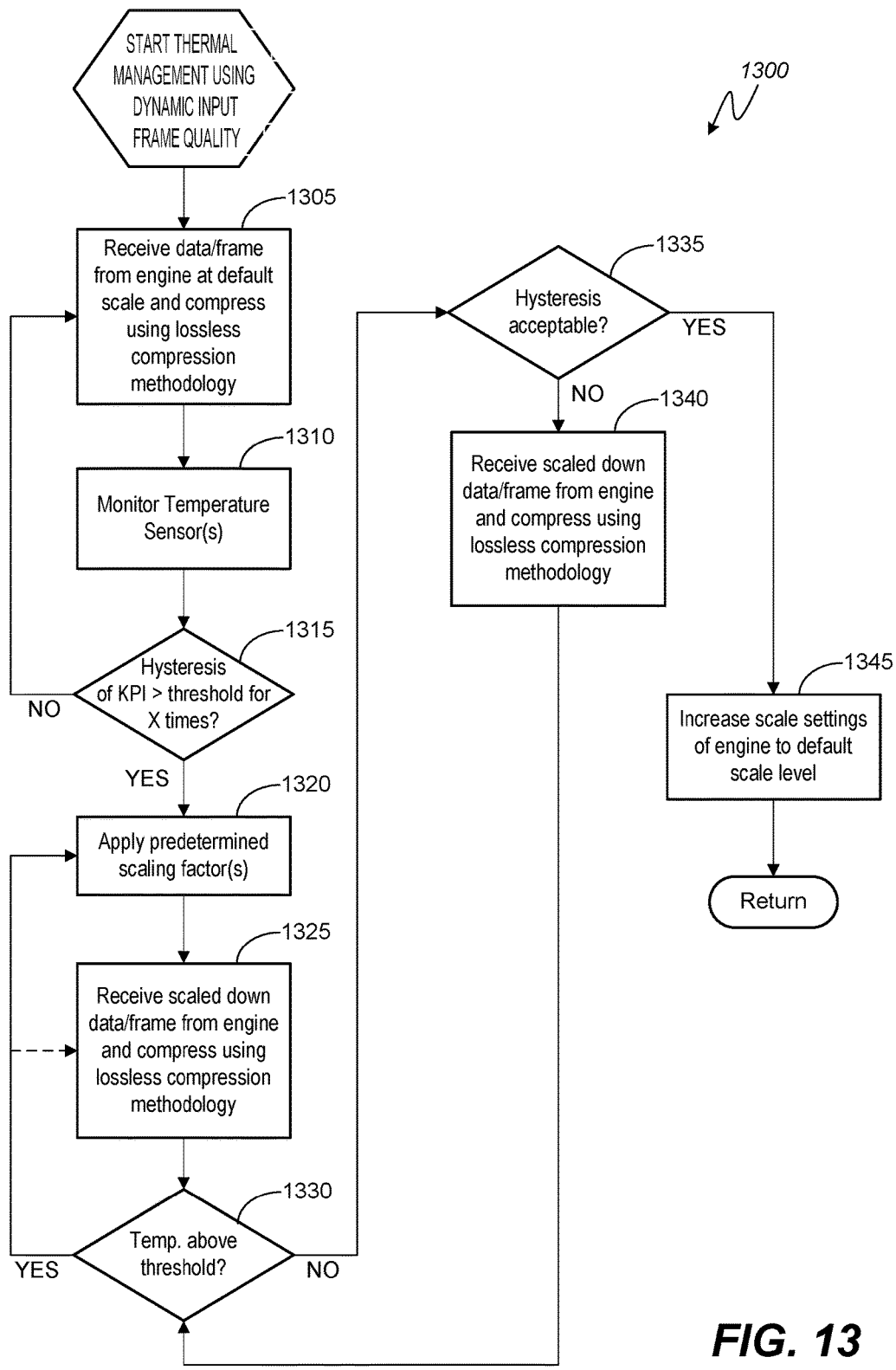
FIG. 13 is a logical flowchart illustrating an intelligent compression method that utilizes a dynamic scaling input compression approach of FIG. 8 in view of thermal energy measurements and thresholds.

FIG. 13 is a logical flowchart illustrating an intelligent compression method 1300 that utilizes a dynamic scaling input compression approach of FIG. 8 in view of thermal energy measurements and thresholds. Notably, the dynamic input scale approach illustrated by the FIG. 8 graph was described using the compression ratio of the output frames as the trigger for determining when to adjust the scale settings for uncompressed frames generated by the producer block, however, it is envisioned that the same methodology may be employed in view of thermal budget constraints and/or thermal measurements as a way to mitigate and manage thermal energy generation. That is, it is envisioned that the dynamic scaling input compression approach of FIG. 8 may be leveraged as a thermal management technique.

Beginning at block 1305, an uncompressed frame produced according to default scale settings may be received into an image CODEC 113 that comprises one or more lossless compression blocks and compressed accordingly. Next, at block 1310, one or more temperature sensors are monitored to determine if thermal energy levels remain at an acceptable level and, at decision block 1315, the temperature reading produced by the sensor(s) is compared to a predetermined threshold. The temperature sensor(s) monitored may be associated with a skin temperature of the PCD 100, a junction temperature of a processing core, a temperature of a PoP memory component, etc. If the temperature is below the predetermined threshold, i.e., the monitored thermal condition is at an acceptable level, then the method 1300 may follow the "NO" branch back to block 1305 and continue compression of incoming uncompressed frames produced and scaled at the default scale settings. If, however, the monitored thermal condition is not at an acceptable level when compared to the predetermined threshold, then the "YES" branch is followed from decision block 1315 to block 1320.

At block 1320, a next produced uncompressed frame is produced and scaled down according to a predetermined scale settings and, at block 1325 received into the CODEC 113 and compressed using the lossless compression algorithm. Notably, the scaling factor used to reduce the size of the uncompressed frame may be indicated in the meta data associated with the compressed frame coming out of CODEC 113 and saved in a storage device. In this way, a consumer block requesting the compressed frame from the storage device at a later time may decompress the frame and then scale it up using the appropriate scaling factor. Advantageously, the scaling down of the uncompressed frame reduces the bandwidth associated with the lossless compression of the relatively smaller uncompressed frame and, in doing so, may cause the thermal condition being monitored to trend back toward an acceptable level.

Next, at decision block 1330 the monitored thermal condition is compared to the predetermined threshold to determine if the thermal condition has returned to an acceptable level. If the monitored temperature sensor(s) reading(s) indicates that the thermal condition may have returned to an acceptable level when compared to the predetermined threshold, then the "NO" branch is followed from decision block 1330 to decision block 1335. If, however, the thermal condition has not returned to an acceptable level, then the method 1300 may follow the "YES" branch back to block 1320 (where the predetermined scaling factor is further reduced). In an alternative embodiment (indicated by broken line between block 1330 and block 1325), the method may follow the "YES" branch back to block 1325 (where the predetermined scaling factor is maintained) instead of to block 1320.

At decision block 1335, the method 1300 may consider whether enough frames have been compressed from scaled down uncompressed frames to justify returning to the default scale settings. Although some embodiments of the solution may trigger reversion back to the default scale settings as soon as the temperature sensor readings indicate that the thermal condition being monitored has returned to an acceptable level, it is envisioned that other embodiments may include a hysteresis consideration to mitigate the probability that the thermal condition may bounce back and forth across the threshold and, in doing so, trigger excessive events of toggling between default scale settings and reduced scale settings.

Returning to the method 1300 at decision block 1335, if a predetermined number of frames have been compressed from scaled down uncompressed frames, or if a predetermined amount of time has elapsed, to justify returning to the default scale settings, the "YES" branch may be followed to block 1345 where the scale settings for uncompressed frames are returned to the default settings. If, however, at decision block 1335 a predetermined number of frames have not been compressed from scaled down uncompressed frames, or if a predetermined amount of time has yet to elapse, to justify returning to the default scale settings, the "NO" branch may be followed to block 1340 and the next uncompressed frame scaled down according to the predetermined scaling factor before being compressed with the lossless algorithm. The method 1300 loops back to decision block 1330.

In this way, the embodiment of the solution for an intelligent compression method using a dynamic scale settings approach may reduce the size of uncompressed frames in order to mitigate detrimental thermal energy generation.

Figure 14:
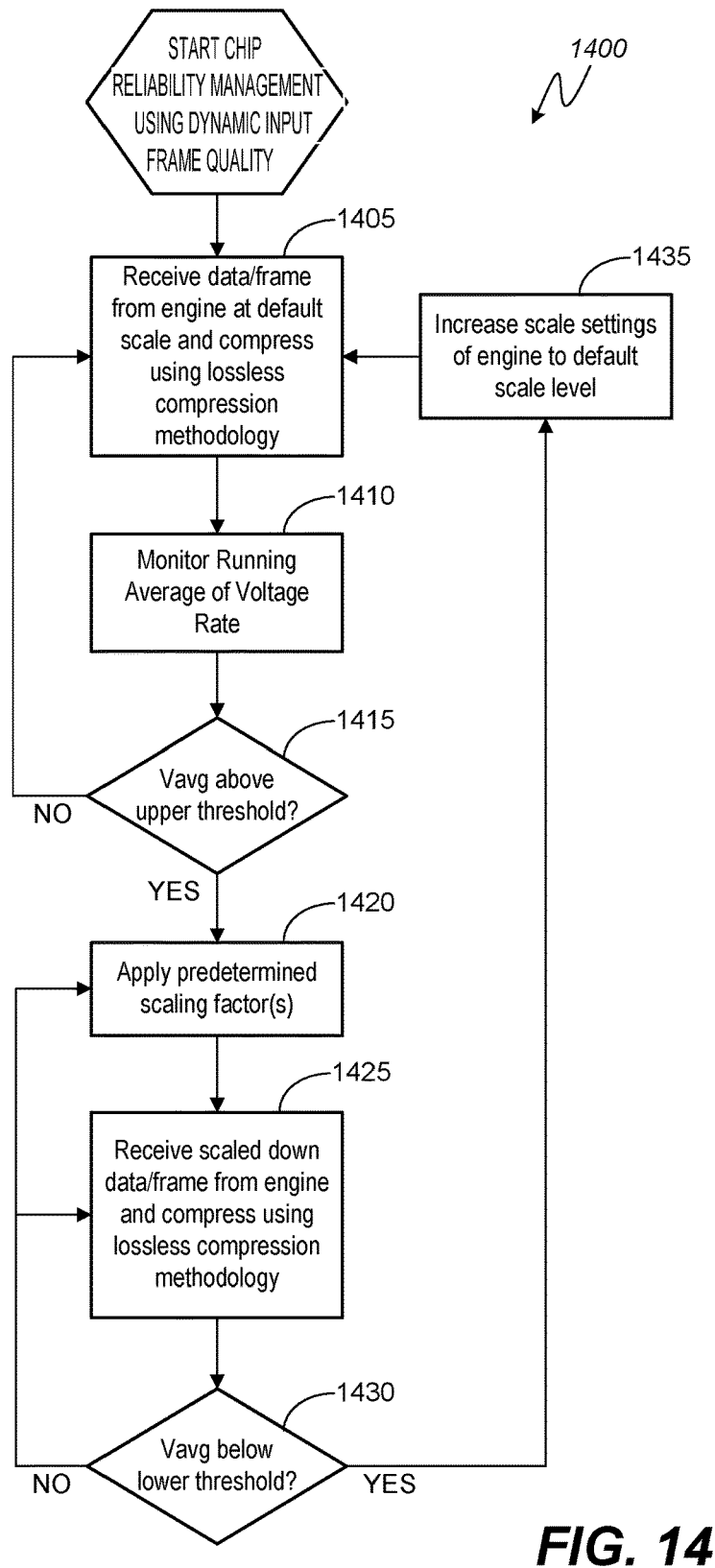
FIG. 14 is a logical flowchart illustrating an intelligent compression method that utilizes a dynamic scaling input compression approach of FIG. 8 in view of a system reliability target associated with average voltage settings.

FIG. 14 is a logical flowchart illustrating an intelligent compression method 1400 that utilizes a dynamic scaling input compression approach of FIG. 8 in view of a system reliability target associated with average voltage settings. Notably, the dynamic input compression approach illustrated by the FIG. 8 graph was described using the compression ratio of the output frames as the trigger for determining when to adjust the scale settings for uncompressed frames generated by the producer, however, it is envisioned that the same methodology may be employed in view of a system reliability target associated with average voltage settings. That is, it is envisioned that the dynamic scaling input compression approach of FIG. 8 may be leveraged as a technique to maintain an average voltage supply between an upper and lower threshold. As one of ordinary skill in the art would understand, to ensure reliability of a chip 102 it may be desirable to keep the average voltage supply below a maximum average but not so far below that the average QoS experienced by a user unnecessarily suffers.

Beginning at block 1405, an uncompressed frame produced according to default scale settings may be received into an image CODEC 113 that comprises one or more lossless compression blocks and compressed accordingly. Next, at block 1410, one or more voltage sensors are monitored for calculation of a running average of the voltage supplied to the chip 102 over time. Based on the running average, the method 1400 may determine if the long term reliability of the chip is acceptable by, at decision block 1415, comparing the voltage average to a predetermined upper threshold. If the voltage supply average is below the predetermined upper threshold, i.e., the predicted long term reliability of the chip is at an acceptable level, then the method 1400 may follow the "NO" branch back to block 1405 and continue compression of incoming uncompressed frames produced and scaled according to default scale settings. If, however, the voltage supply average is not at an acceptable level when compared to the predetermined upper threshold, then the "YES" branch is followed from decision block 1415 to block 1420.

At block 1420, a next uncompressed frame is produced and scaled down according to a predetermined scale setting(s) and, at block 1425 received into the CODEC 113 and compressed using the lossless compression algorithm. Notably, the scaling factor used to reduce the size of the uncompressed frame may be indicated in the meta data associated with the compressed frame coming out of CODEC 113 and saved in a storage device. In this way, a consumer block requesting the compressed frame from the storage device at a later time may decompress the frame and then scale it up using the appropriate scaling factor. Advantageously, the scaling down of the uncompressed frame reduces the bandwidth associated with the lossless compression of the relatively smaller uncompressed frame and, in doing so, may cause the relevant KPI to trend back toward an acceptable level.

Next, at decision block 1430, the voltage supply average is compared to a predetermined low threshold. If the voltage supply average calculated from the monitored voltage sensor(s) remains above the lower threshold, then the method 1400 may follow the "NO" branch back to either block 1425 (where the predetermined scaling factor is maintained) or block 1420 (where the predetermined scaling factor is further reduced). If, however, the voltage supply average indicates that the average voltage supply to the chip 102 has fallen below the low average threshold, then the "YES" branch is followed from decision block 1430 to block 1435. At block 1435, the scale level settings of the producer may be increased back to the default levels. The method 1400 loops back to block 1405.

In this way, the embodiment of the solution for an intelligent compression method using a dynamic scale settings approach may reduce the size of uncompressed frames in order to maintain an average voltage supply in a range associated with a target chip reliability goal.

Figure 15:
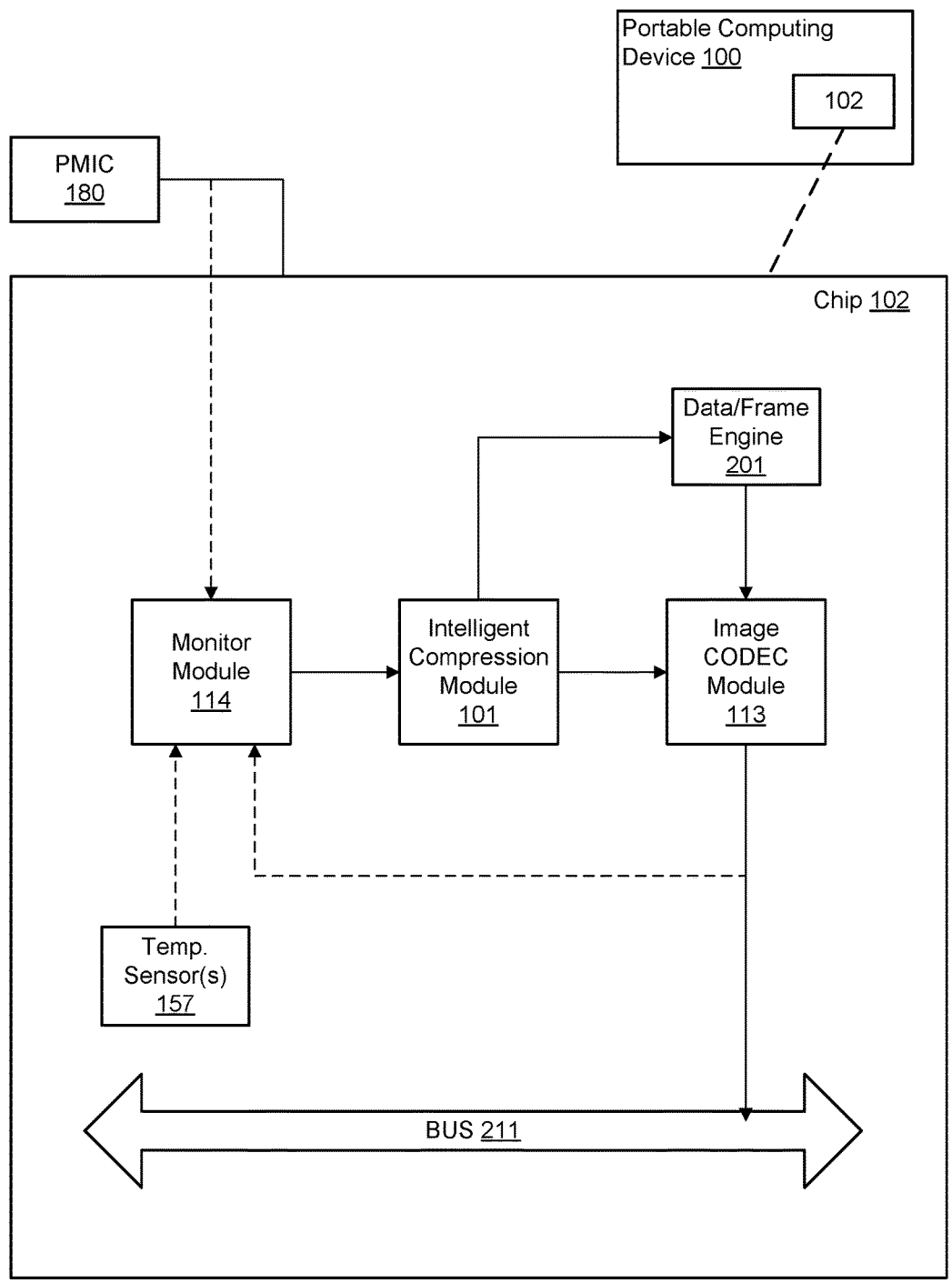
FIG. 15 is a functional block diagram illustrating an embodiment of an on-chip system for intelligent compression.

FIG. 15 is a functional block diagram illustrating an embodiment of system-on-chip ("SoC") or chip 102 for intelligent compression. The chip 102 may be configured to implement any one or more of the intelligent compression methodologies described herein including a mixed mode approach and/or a dynamic quality settings approach. The monitor module 114, depending on the embodiment of the solution being implemented, may monitor power or voltage levels associated with the power management integrated circuit ("PMIC") 180 and being supplied to the chip 102, temperature readings from sensors 157, compression ratios of compressed frames emanating from image CODEC module 113, or any other relevant KPI. CODEC module 113 may be coupled to a main bus 211 of the chip 102.

The intelligent compression ("IC") module 101 may work with the frame producer, such as data/frame engine 201, to dynamically adjust image quality settings at which uncompressed frames are produced before being input to the image CODEC module 113 for compression. Alternatively, the intelligent compression ("IC") module 101 may work with the frame producer, such as data/frame engine 201, to dynamically adjust scale settings at which uncompressed frames are scaled after being produced but before being input to the image CODEC module 113 for compression. Alternatively, the IC module 101 may work with the image CODEC module 113 to toggle between lossless and lossy compression algorithms. Consistent with that which has been described above relative to FIGS. 4 through 14, the IC module 101 may instruct the producer engine 201 and/or the image CODEC module 113 based on input data from the monitor module 114 regarding compression ratios of compressed frames, temperature readings from sensors 157, voltage levels, or any relevant KPI.

Figure 16A:
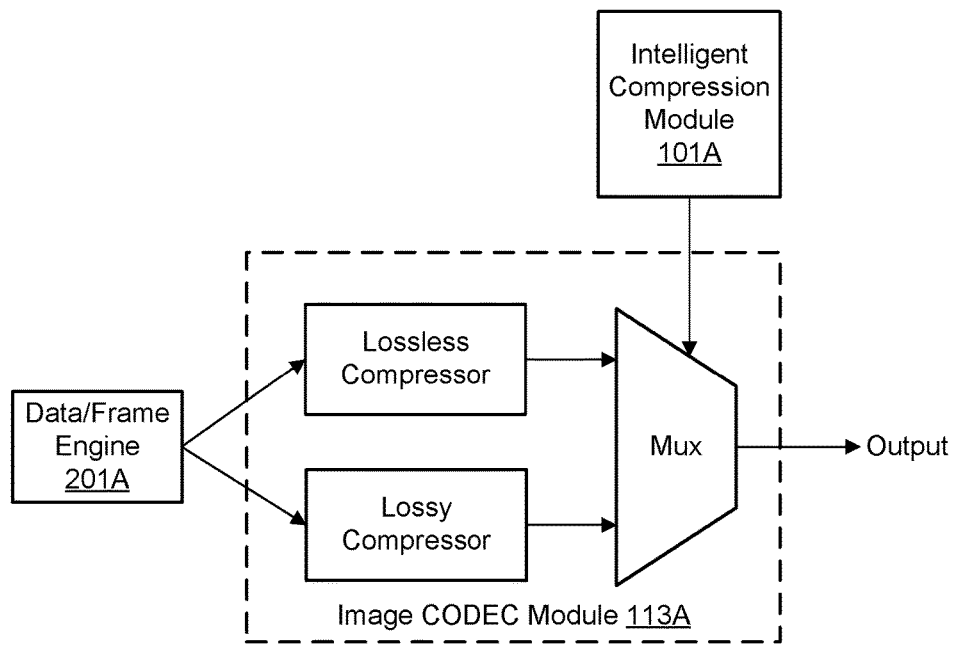
FIG. 16A is a functional block diagram illustrating an embodiment of the image CODEC module of FIG. 15 configured for implementation of an intelligent compression approach that utilizes a mixed mode compression including lossless and lossy algorithms.

FIG. 16A is a functional block diagram illustrating an embodiment of the image CODEC module of FIG. 15 configured for implementation of an intelligent compression approach that utilizes a mixed mode compression including lossless and lossy algorithms. When the system 102 is configured for execution of an intelligent compression method using a mixed mode approach, consistent with that which has been described relative to FIGS. 4 through 7, the producer engine 201A may provide its uncompressed frame input to the image CODEC 113A which, in turn, may compress the frame according to either a lossless compressor block or a lossy compression block. The determination as to which compressor block may be used to compress a given frame is dependent upon instructions received from the IC module 101A. The IC module 101A may generate the instructions in view of any one or more inputs received from the monitor module 114 (FIG. 15).

Figure 16B:
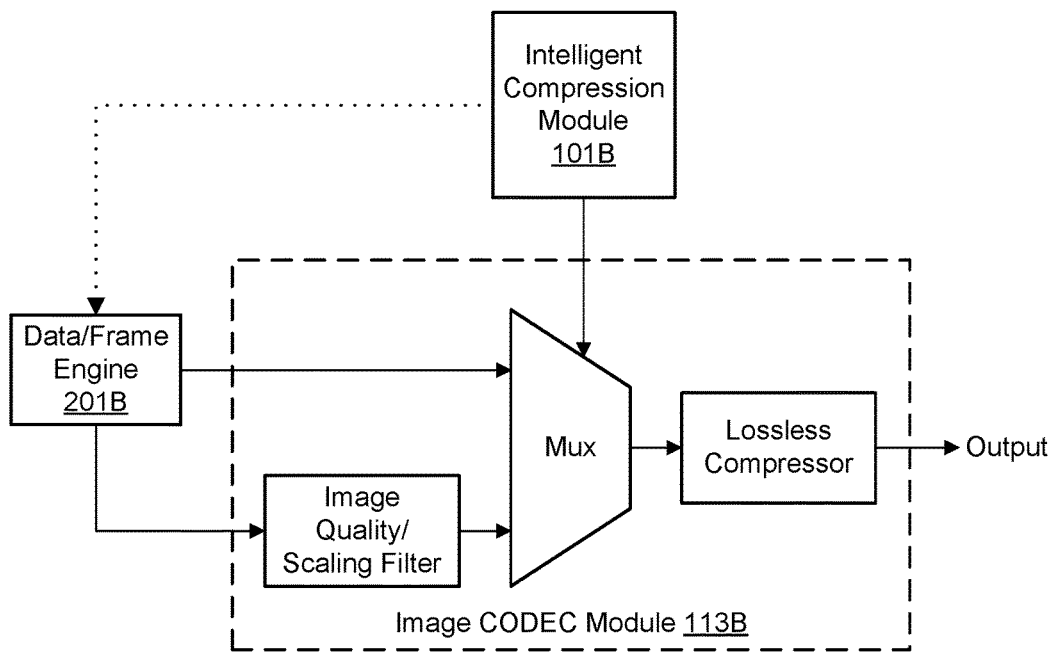
FIG. 16B is a functional block diagram illustrating an embodiment of the image CODEC module of FIG. 15 configured for implementation of an intelligent compression approach that utilizes a lossless compression algorithm after dynamic adjustment of an image quality setting.

FIG. 16B is a functional block diagram illustrating an embodiment of the image CODEC module of FIG. 15 configured for implementation of an intelligent compression approach that utilizes a lossless compression algorithm after dynamic adjustment of an image quality setting. When the chip 102 is configured for execution of an intelligent compression method using a dynamic quality setting approach, consistent with that which has been described relative to FIGS. 8 through 14, the producer engine 201B may provide its uncompressed (and possibly scaled) frame input to the image CODEC 113B which, in turn, will compress the frame according to a lossless compressor block. The complexity of the uncompressed frame produced by the engine 201B may be dictated by the image quality level settings or the scale settings dictated to it by the IC module 101B.

As shown in the FIG. 16B illustration, an image quality filter and multiplexer ("Mux") logic comprised within the image CODEC module 113B, and upstream of the lossless compressor, may be comprised within the engine 201B in other embodiments. Regardless of the particular arrangement, the IC module 101B dictates whether an uncompressed frame produced at the default image quality settings or an uncompressed frame produced at reduced image quality settings is ultimately compressed by the image CODEC module 113B. The IC module 101B may generate the instructions for adjustment of image quality settings at which uncompressed frames are produced in view of any one or more inputs received from the monitor module 114.

Figure 17:
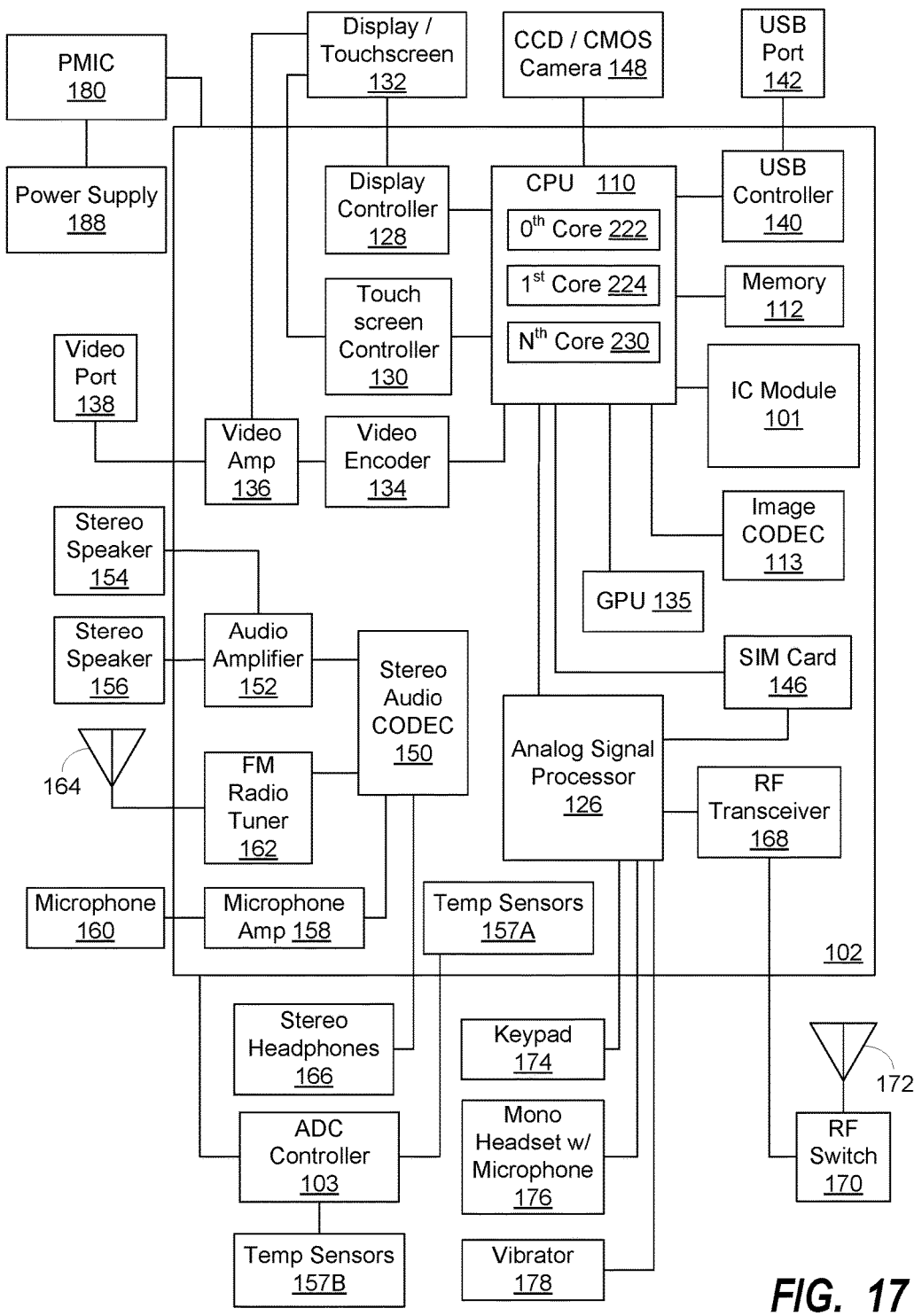
FIG. 17 is a functional block diagram illustrating an exemplary, non-limiting aspect of a portable computing device ("PCD") in the form of a wireless telephone for implementing intelligent compression methods and systems.

FIG. 17 is a functional block diagram illustrating an exemplary, non-limiting aspect of a portable computing device ("PCD") 100 in the form of a wireless telephone for implementing intelligent compression methods and systems. As shown, the PCD 100 includes an SoC or chip 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill. A GPU 135 may be coupled to the CPU 110.

In general, intelligent compression ("IC") module 101 may be formed from hardware and/or firmware and may be responsible for dynamically adjusting image quality settings at which a producer generates an uncompressed frame and/or for causing an image CODEC module 113 to toggle between lossy and lossless compression algorithms. As illustrated in FIG. 17, a display controller 128 and a touch screen controller 130 are coupled to the digital signal processor 110. A touch screen display 132 external to the chip 102 is coupled to the display controller 128 and the touch screen controller 130. PCD 100 may further include a video encoder 134, e.g., a phase-alternating line ("PAL") encoder, a sequential couleur avec memoire ("SECAM")

encoder, a national television system(s) committee ("NTSC") encoder or any other type of video encoder 134. The video encoder 134 is coupled to the multi-core CPU 110. A video amplifier 136 is coupled to the video encoder 134 and the touch screen display 132. A video port 138 is coupled to the video amplifier 136. As depicted in FIG. 17, a universal serial bus ("USB") controller 140 is coupled to the CPU 110. Also, a USB port 142 is coupled to the USB controller 140.

A memory 112, which may include a PoP memory, a cache, a mask ROM/Boot ROM, a boot OTP memory, a type DDR of DRAM memory may also be coupled to the CPU 110. A subscriber identity module ("SIM") card 146 may also be coupled to the CPU 110. Further, as shown in FIG. 17, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 17, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 17 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 17 further indicates that a radio frequency ("RF") transceiver 168 may be coupled to the analog signal processor 126. An RF switch 170 may be coupled to the RF transceiver 168 and an RF antenna 172. As shown in FIG. 17, a keypad 174 may be coupled to the analog signal processor 126. Also, a mono headset with a microphone 176 may be coupled to the analog signal processor 126. Further, a vibrator device 178 may be coupled to the analog signal processor 126. FIG. 17 also shows that a power supply 188, for example a battery, is coupled to the chip 102 through a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157A and 157B may produce voltage drops that are converted to digital signals with an analog-to-digital converter ("ADC") controller 103. However, other types of thermal sensors may be employed.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, the PMIC 180 and the power supply 188 are external to the chip 102. It will be understood, however, that one or more of these devices depicted as external to the chip 102 in the exemplary embodiment of a PCD 100 in FIG. 17 may reside on chip 102 in other exemplary embodiments.

In a particular aspect, one or more of the method steps described herein may be implemented by executable instructions and parameters stored in the memory 112 or as form the IC module 101 and/or the image CODEC module 113. Further, the IC module 101, the image CODEC module 113, the memory 112, the instructions stored therein, or a combination thereof may serve as a means for performing one or more of the method steps described herein.

Figure 18:
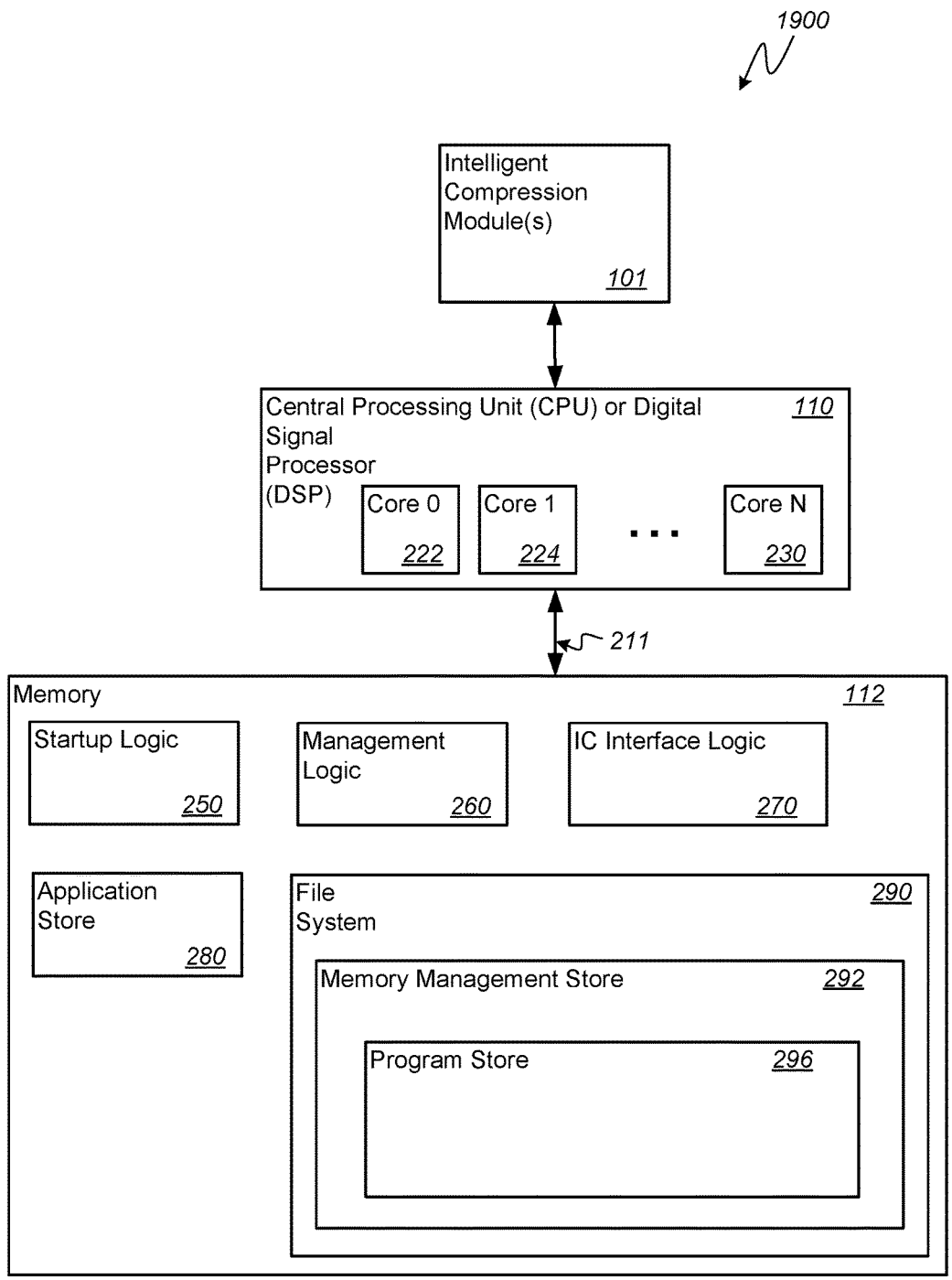
FIG. 18 is a schematic diagram illustrating an exemplary software architecture of the PCD of FIG. 17 for executing intelligent compression methodologies.

FIG. 18 is a schematic diagram 1900 illustrating an exemplary software architecture of the PCD of FIG. 14 for executing intelligent compression methodologies. As illustrated in FIG. 18, the CPU or digital signal processor 110 is coupled to the memory 112 via main bus 211. The CPU 110, as noted above, is a multiple-core processor having N core processors. That is, the CPU 110 includes a zeroth core 222, a first core 224, and an $N^{th}$ core 230. As is known to one of ordinary skill in the art, each of the zeroth core 222, the first core 224 and the $N^{th}$ core 230 are available for supporting a dedicated application or program. Alternatively, one or more applications or programs may be distributed for processing across two or more of the available cores.

The CPU 110 may receive commands from the IC module(s) 101 that may comprise software and/or hardware. If embodied as software, the module(s) 101 comprise instructions that are executed by the CPU 110 that issues commands to other application programs being executed by the CPU 110 and other processors.

The zeroth core 222, the first core 224 through to the Nth core 230 of the CPU 110 may be integrated on a single integrated circuit die, or they may be integrated or coupled on separate dies in a multiple-circuit package. Designers may couple the zeroth core 222, the first core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art and described above in the definitions. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 15, it should be noted that one or more of startup logic 250, management logic 260, IC interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the IC interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for intelligent compression. The startup logic 250 may identify, load and execute a select intelligent compression program. An exemplary select program may be found in the program store 296 of the embedded file system 290. The exemplary select program, when executed by one or more of the core processors in the CPU 110 may operate in accordance with one or more signals provided by the IC module 101 to implement intelligent compression methodologies.

The management logic 260 includes one or more executable instructions for terminating an IC program on one or more of the respective processor cores, as well as selectively identifying, loading, and executing a more suitable replacement program. The management logic 260 is arranged to perform these functions at run time or while the PCD 100 is powered and in use by an operator of the device. A replacement program may be found in the program store 296 of the embedded file system 290.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the particular type of compression algorithm used and/or to the target application of an active intelligent compression approach at the frame level or tile level.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 may be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged memory management store 292. In this regard, the file system 290 may include a reserved section of its total file system capacity for the storage of information for the configuration and management of the various IC algorithms used by the PCD 100.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Therefore, although selected aspects have been illustrated and described in detail, it will be understood that various substitutions and alterations may be made therein without departing from the spirit and scope of the present invention, as defined by the following claims.

What is claimed is:

1. A method for intelligent data compression in a portable computing device ("PCD"), the method comprising:
defining a threshold value for a key performance indicator within the PCD;
receiving a first data block produced by a producer component of the PCD and scaled at a default scale level setting and compressing the first data block according to a lossless compression algorithm;
monitoring an active level for the key performance indicator and comparing the active level to the defined threshold value;
in response to a comparison of the active level for the key performance indicator to the defined threshold value indicating, by a relation between the active level and the defined threshold value, degradation in PCD performance resulting from lossless compression of the first data block, modifying scale settings for data blocks generated by the producer component of the PCD to a reduced scale setting;
receiving a second data block produced by the producer component of the PCD and scaled at the reduced scale setting and compressing the second data block according to the lossless compression algorithm;
storing the compressed second data block in a memory component of the PCD, wherein metadata associated with the compressed second data block includes an indicator of the reduced scale setting; and
a consumer component of the PCD retrieving the compressed second data block from the memory component of the PCD, decompressing the second data block, and up-scaling the decompressed second data block based on the indicator of the reduced scale setting included within the metadata.

2. The method of claim 1, wherein the key performance indicator is selected from a group comprised of: a compression ratio for data blocks compressed by the compression module, a voltage level, an average voltage supply level, a frame rate, and a processing time for compressing a data block.

3. The method of claim 1, wherein the key performance indicator is a temperature reading generated by a temperature sensor within the PCD.

4. The method of claim 1, wherein modifying scale settings for data blocks generated by the producer component is further based on a hysteresis calculation.

5. The method of claim 1, wherein the first and second data blocks are image frames.

6. The method of claim 1, wherein the first and second data blocks are sub-units of an image frame.

7. The method of claim 1, wherein the PCD is in the form of a wireless telephone.

8. A system for intelligent data compression in a portable computing device ("PCD"), the system comprising:
a data compression controller configured to define a threshold value for a key performance indicator within the PCD;
a CODEC configured to receive a first data block produced by a producer component of the PCD and scaled at a default scale level setting and compress the first data block according to a lossless compression algorithm;
a threshold comparator configured to monitor an active level for the key performance indicator resulting from lossless compression of the first data block and compare the active level to the defined threshold value;
the data compression controller further configured to, in response to a comparison of the active level for the key performance indicator to the defined threshold value indicating, by a relation between the active level and the defined threshold value, degradation in PCD performance resulting from lossless compression of the first data block, modify scale settings for data blocks generated by the producer component of the PCD to a reduced scale setting;
the CODEC further configured to receive a second data block produced by the producer component of the PCD and scaled at the reduced scale setting and compress the second data block according to the lossless compression algorithm;
the data compression controller further configured to store the compressed second data block in a memory component of the PCD, wherein metadata associated with the compressed second data block comprises an indicator of the reduced scale setting; and
a consumer component of the PCD configured to retrieve the compressed second data block from the memory component of the PCD, decompress the second data block, and up-scale the decompressed second data block based on the indicator of the reduced scale setting comprised within the metadata.

9. The system of claim 8, wherein the key performance indicator is selected from a group comprised of: a compression ratio for data blocks compressed by the compression module, a voltage level, an average voltage supply level, a frame rate, and a processing time for compressing a data block.

10. The system of claim 8, wherein the key performance indicator is a temperature reading generated by a temperature sensor within the PCD.

11. The system of claim 8, wherein modifying scale settings for data blocks generated by the producer component is further based on a hysteresis calculation.

12. The system of claim 8, wherein the first and second data blocks are image frames.

13. The system of claim 8, wherein the first and second data blocks are sub-units of an image frame.

14. The system of claim 8, wherein the PCD is in the form of a wireless telephone.

15. A system for intelligent data compression in a portable computing device ("PCD"), the system comprising:
means for defining a threshold value for a key performance indicator within the PCD;
means for receiving a first data block produced by a producer component of the PCD and scaled at a default scale level setting and compressing the first data block according to a lossless compression algorithm;
means for monitoring an active level for the key performance indicator resulting from lossless compression of the first data block and comparing the active level to the defined threshold value;

means for, in response to a comparison of the active level for the key performance indicator to the defined threshold value indicating, by a relation between the active level and the defined threshold value, degradation in PCD performance resulting from lossless compression of the first data block, modifying scale settings for data blocks generated by the producer component of the PCD to a reduced scale setting;

means for receiving a second data block produced by the producer component of the PCD and scaled at the reduced scale setting and compressing the second data block according to the lossless compression algorithm;

means for storing the compressed second data block in a memory component of the PCD, wherein metadata associated with the compressed second data block comprises an indicator of the reduced scale setting; and means for, by a consumer component of the PCD, retrieving the compressed second data block from the memory component of the PCD, decompressing the second data block, and up-scaling the decompressed second data block based on the indicator of the reduced scale setting comprised within the metadata.

16. The system of claim 15, wherein the key performance indicator is selected from a group comprised of: a compression ratio for data blocks compressed by the compression module, a voltage level, an average voltage supply level, a frame rate, and a processing time for compressing a data block.

17. The system of claim 15, wherein the key performance indicator is a temperature reading generated by a temperature sensor within the PCD.

18. The system of claim 15, wherein modifying scale settings for data blocks generated by the producer component is further based on a hysteresis calculation.

19. The system of claim 15, wherein the first and second data blocks are image frames.

20. The system of claim 15, wherein the first and second data blocks are sub-units of an image frame.

21. The system of claim 15, wherein the PCD is in the form of a wireless telephone.

22. A computer program product comprising a non-transitory computer usable medium having a computer readable program code embodied therein, said computer readable program code adapted to be executed to implement a method for intelligent data compression in a portable computing device ("PCD"), said method comprising:

defining a threshold value for a key performance indicator within the PCD;

receiving a first data block produced by a producer component of the PCD and scaled at a default scale level setting and compressing the first data block according to a lossless compression algorithm;

monitoring an active level for the key performance indicator resulting from lossless compression of the first data block and comparing the active level to the defined threshold value;

in response to a comparison of the active level for the key performance indicator to the defined threshold value indicating, by a relation between the active level and the defined threshold value, degradation in PCD performance resulting from lossless compression of the first data block, modifying scale settings for data blocks generated by the producer component of the PCD to a reduced scale setting;

receiving a second data block produced by the producer component of the PCD and scaled at the reduced scale setting into the compression module and compressing the second data block according to the lossless compression algorithm;

storing the compressed second data block in a memory component of the PCD, wherein metadata associated with the compressed second data block comprises an indicator of the reduced scale setting; and a consumer component of the PCD retrieving the compressed second data block from the memory component of the PCD, decompressing the second data block, and up-scaling the decompressed second data block based on the indicator of the reduced scale setting comprised within the metadata.

23. The computer program product of claim 22, wherein the key performance indicator is selected from a group comprised of: a compression ratio for data blocks compressed by the compression module, a voltage level, an average voltage supply level, a frame rate, and a processing time for compressing a data block.

24. The computer program product of claim 22, wherein the key performance indicator is a temperature reading generated by a temperature sensor within the PCD.

25. The computer program product of claim 22, wherein modifying scale settings for data blocks generated by the producer component is further based on a hysteresis calculation.

26. The computer program product of claim 22, wherein the first and second data blocks are image frames.

27. The computer program product of claim 22, wherein the first and second data blocks are sub-units of an image frame.

28. The computer program product of claim 22, wherein the PCD is in the form of a wireless telephone.

* * * * *